(12) United States Patent
Hu et al.

(10) Patent No.: US 8,493,651 B1
(45) Date of Patent: Jul. 23, 2013

(54) APPARATUS FOR OPTICAL FIBER MANAGEMENT AND COOLING

(75) Inventors: Yongdan Hu, Bothell, WA (US); Eric C. Eisenberg, Shoreline, WA (US); Aleksandra Shepsis, Lynnwood, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 392 days.

(21) Appl. No.: 12/953,292

(22) Filed: Nov. 23, 2010

Related U.S. Application Data

(60) Provisional application No. 61/343,945, filed on Apr. 12, 2010.

(51) Int. Cl.
*H04B 10/17* (2006.01)
*G02B 6/125* (2006.01)

(52) U.S. Cl.
USPC ............................................ 359/341.1

(58) Field of Classification Search
USPC ................... 359/341.1, 341.3; 372/6
See application file for complete search history.

(56) References Cited

U.S. PATENT DOCUMENTS

| | | | |
|---|---|---|---|
| 6,178,187 B1 * | 1/2001 | Ueda | 372/6 |
| 6,424,784 B1 | 7/2002 | Olson | |
| 6,456,756 B1 | 9/2002 | Mead et al. | |
| 6,535,684 B1 * | 3/2003 | Kondo et al. | 385/137 |
| 6,795,460 B1 * | 9/2004 | Itoh | 372/34 |
| 6,829,426 B1 * | 12/2004 | Arellano | 385/135 |
| 7,199,924 B1 | 4/2007 | Brown et al. | |
| 7,379,648 B1 | 5/2008 | Brooks et al. | |
| 7,386,211 B1 | 6/2008 | Di Teodoro et al. | |
| 7,391,561 B2 | 6/2008 | Di Teodoro et al. | |
| 7,400,804 B1 | 7/2008 | Di Teodoro et al. | |
| 7,400,812 B2 | 7/2008 | Seifert | |
| 7,429,734 B1 | 9/2008 | Tidwell | |
| 7,430,352 B2 | 9/2008 | Di Teodoro et al. | |
| 7,471,705 B2 | 12/2008 | Gerstenberger et al. | |
| 7,620,077 B2 | 11/2009 | Henderson | |
| 7,701,987 B1 | 4/2010 | Savage-Leuchs et al. | |

(Continued)

FOREIGN PATENT DOCUMENTS

JP  3004092 A  *  1/1991

OTHER PUBLICATIONS

Lapointe, et al., "Thermal Effects in High-Power CW Fiber Lasers", "Proceeding of SPIE (Photonics West 2009)", 2009, pp. 71951U-71951U-11, vol. 7195.

*Primary Examiner* — Eric Bolda
(74) *Attorney, Agent, or Firm* — Charles A. Lemaire; Lemaire Patent Law Firm, P.L.L.C.

(57) ABSTRACT

An apparatus and method that provides management and cooling of an optical fiber by looping the optical fiber around the inner surface of a heat-conductive cylinder and around the outer surface of the heat-conductive cylinder, such that the optical fiber enters and exits the heat-conductive cylinder on substantially the same plane. Some embodiments use a continuous groove on the inside and outside of the cylinder for guiding and managing the optical fiber. Some embodiments use a plurality of protruding fiber guides for guiding and managing the optical fiber. Some embodiments use an integrated tube for guiding and managing the optical fiber. In some embodiments, the optical fiber looped on the inner surface and outer surface are spaced apart substantially equally. In some other embodiments, the optical fiber loops are spaced further apart for portions of the fiber carrying higher power.

20 Claims, 7 Drawing Sheets

U.S. PATENT DOCUMENTS

| | | |
|---|---|---|
| 7,768,700 B1 | 8/2010 | Savage-Leuchs |
| 7,792,166 B2 | 9/2010 | Borschowa |
| 7,872,794 B1 | 1/2011 | Minelly et al. |
| 7,924,500 B1 | 4/2011 | Minelly |
| 2009/0244840 A1* | 10/2009 | Takawa et al. ............ 361/695 |
| 2011/0091155 A1 | 4/2011 | Yilmaz et al. |
| 2011/0122482 A1 | 5/2011 | Mead |

* cited by examiner

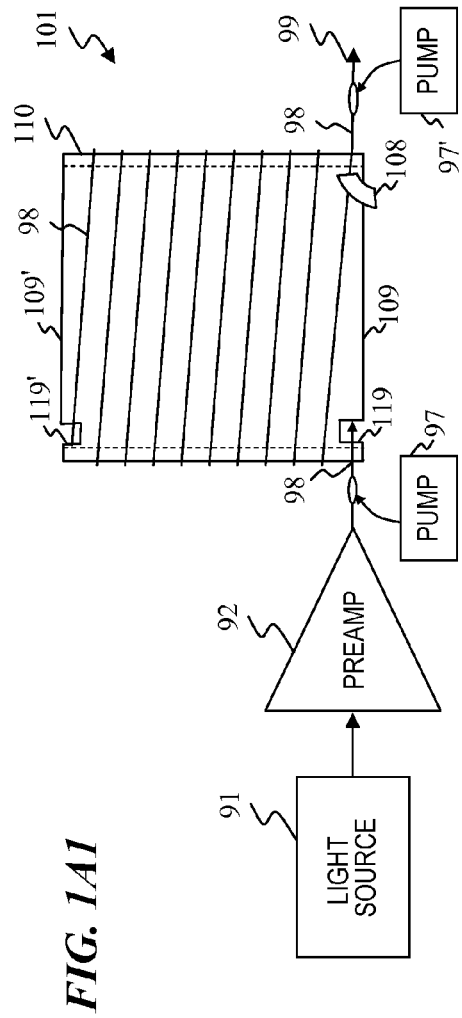
FIG. 1A1
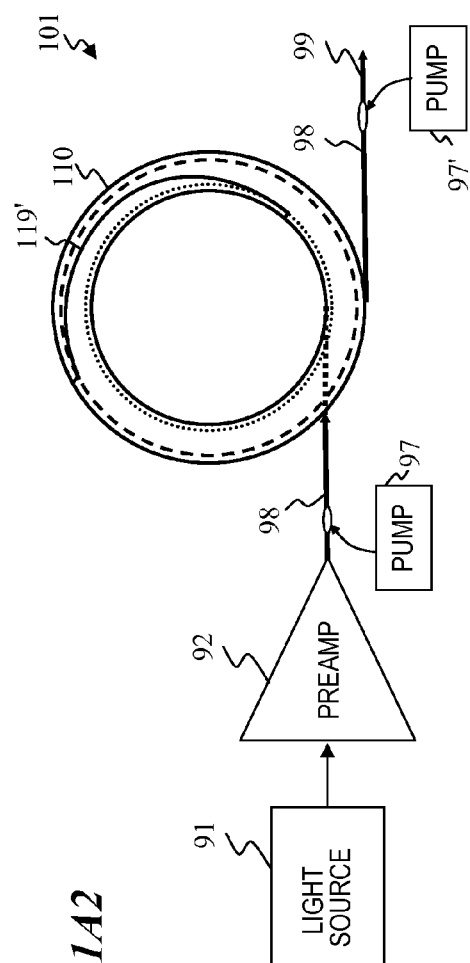
FIG. 1A2

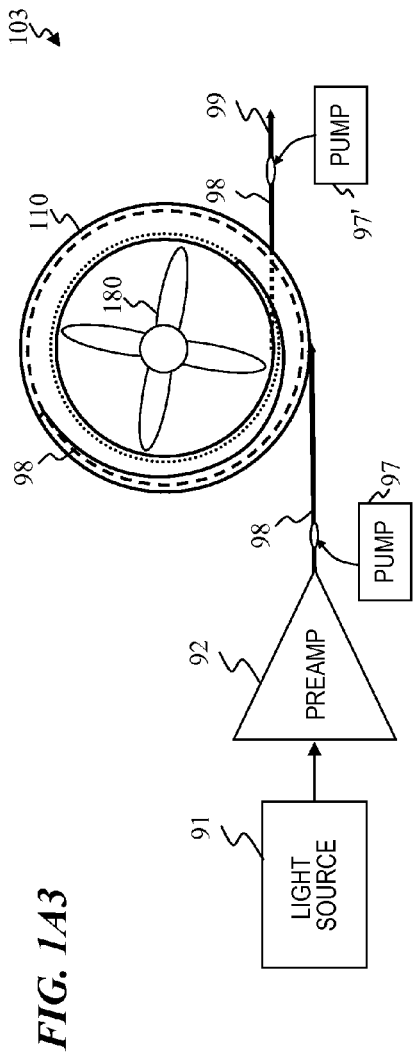
FIG. 1A3
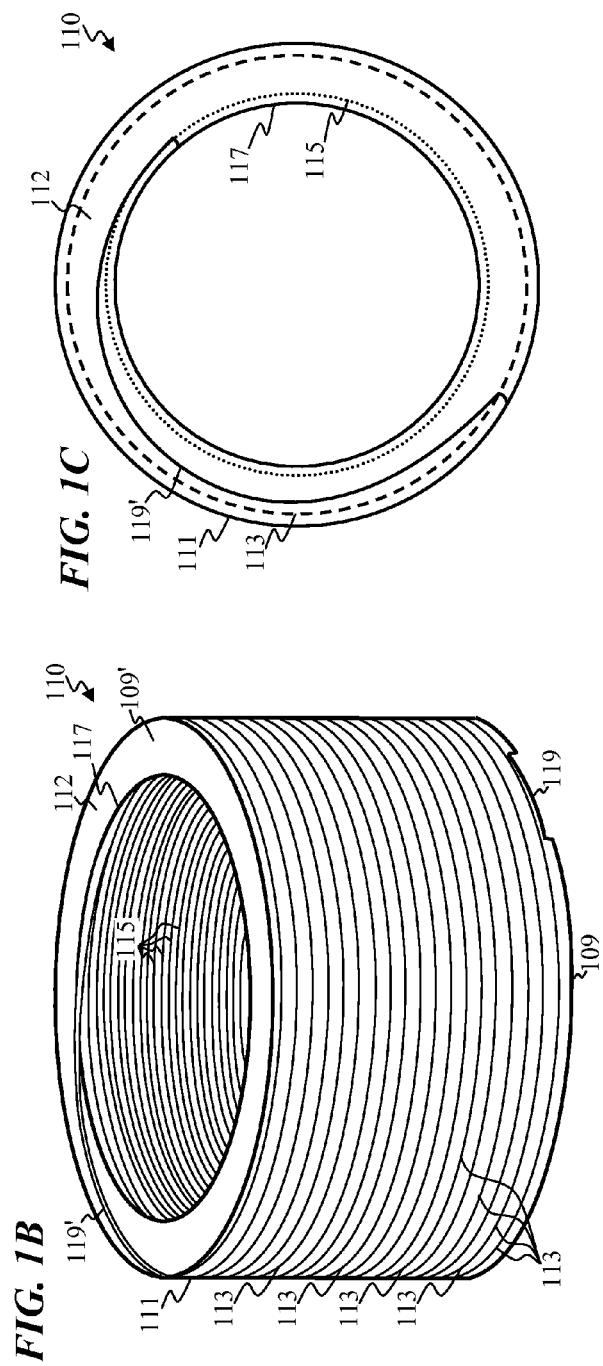
FIG. 1C
FIG. 1B

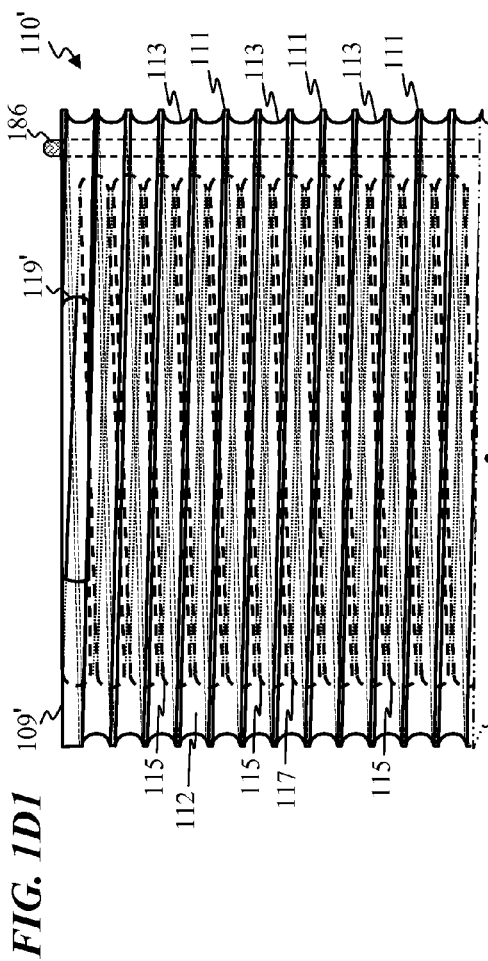
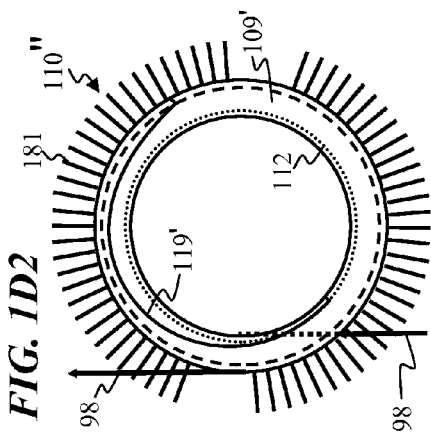
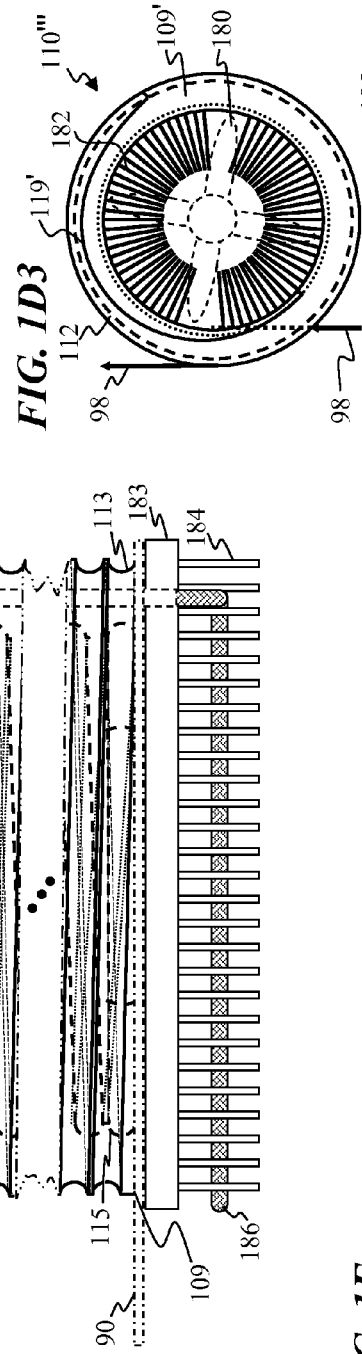
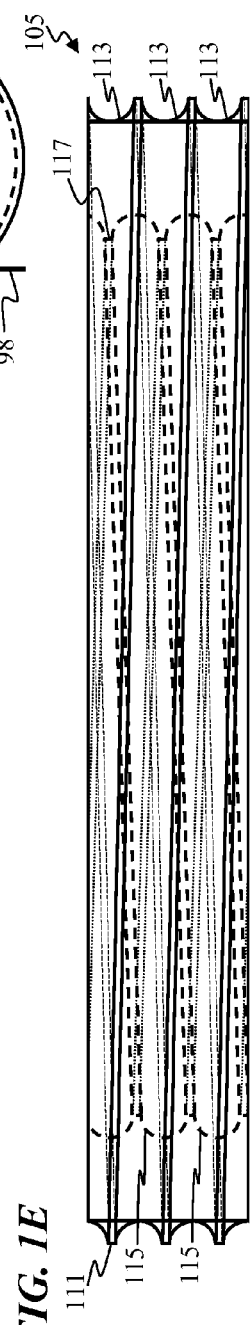

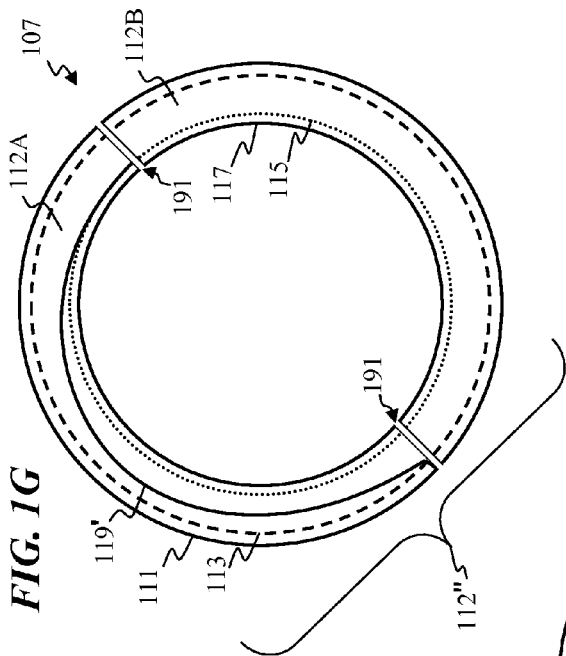
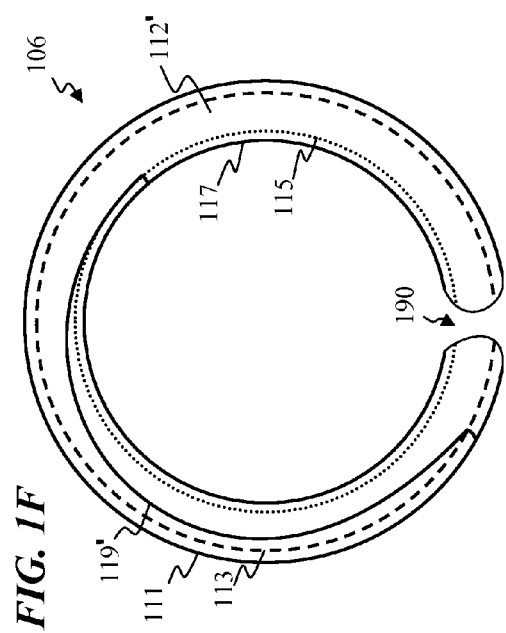
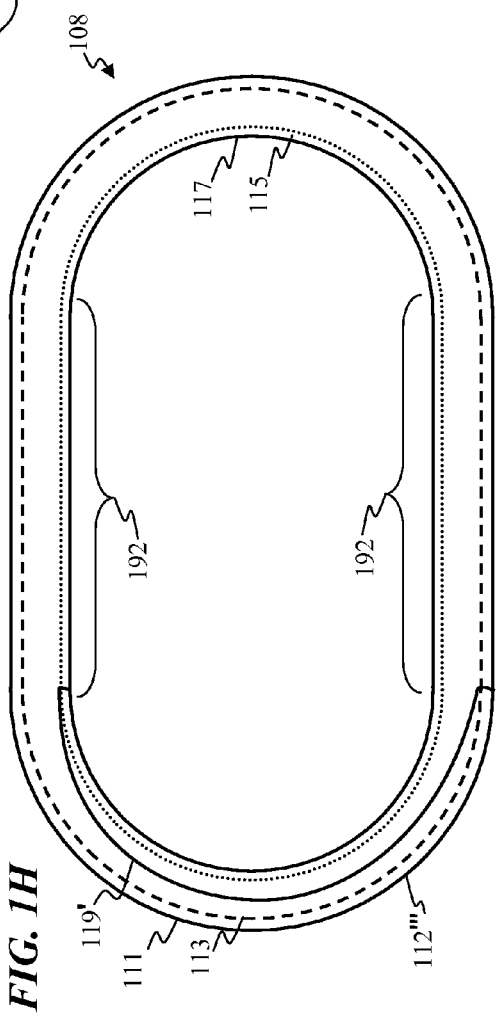

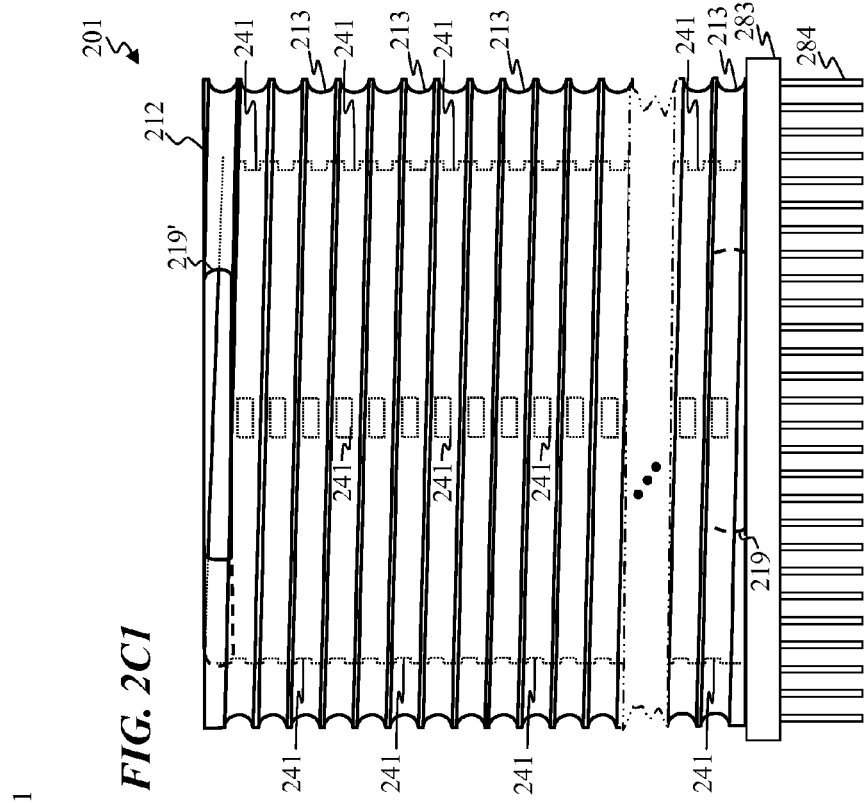
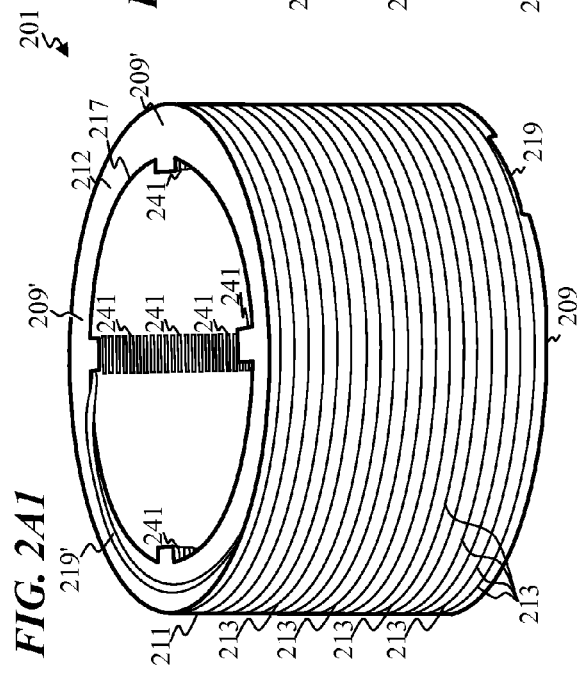
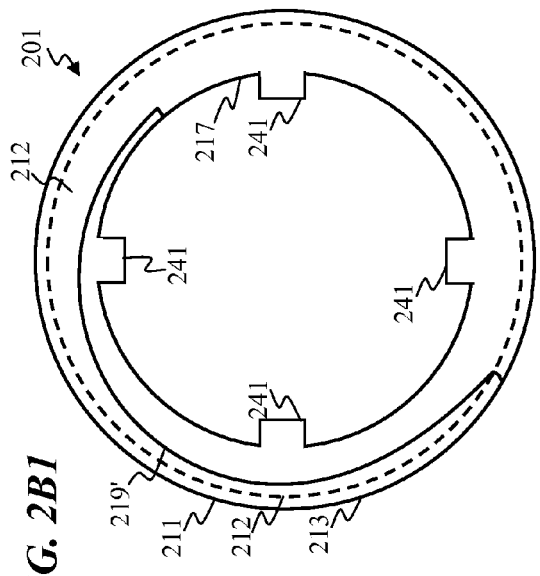
FIG. 2C1
FIG. 2A1
FIG. 2B1

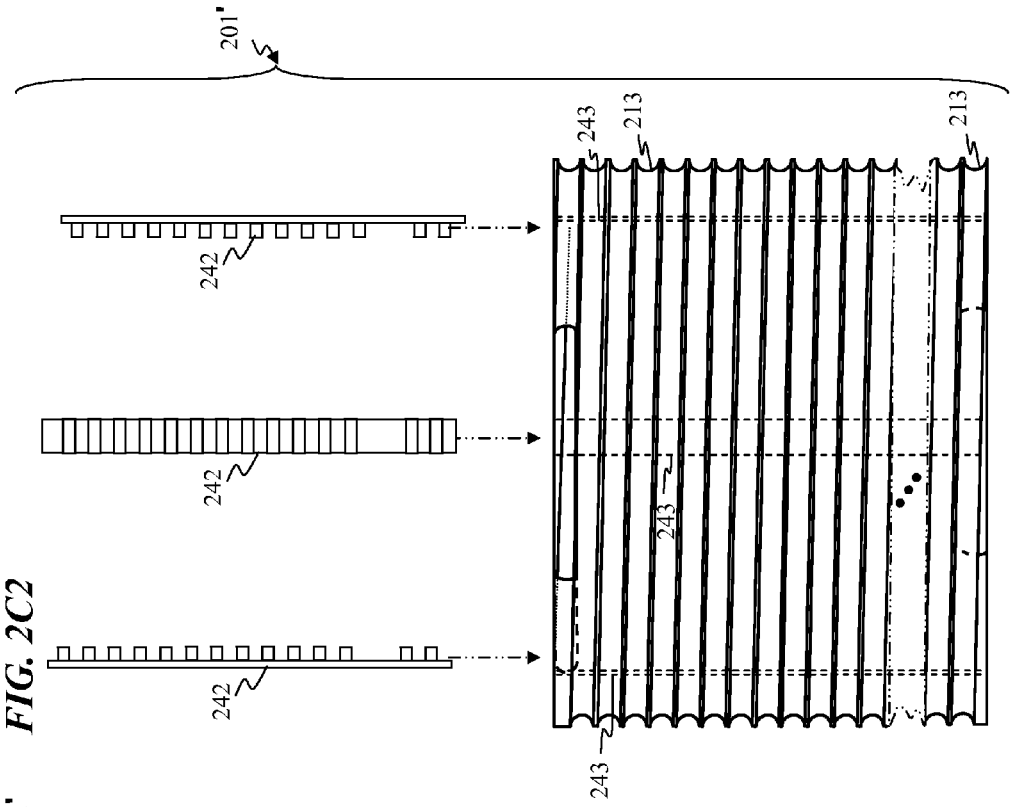
FIG. 2C2
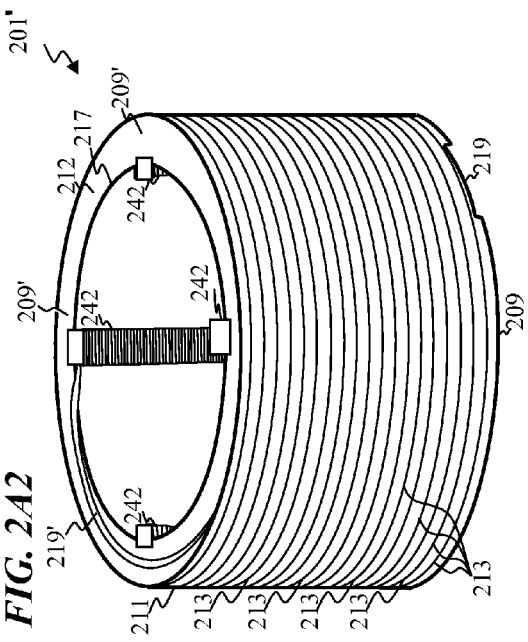
FIG. 2A2
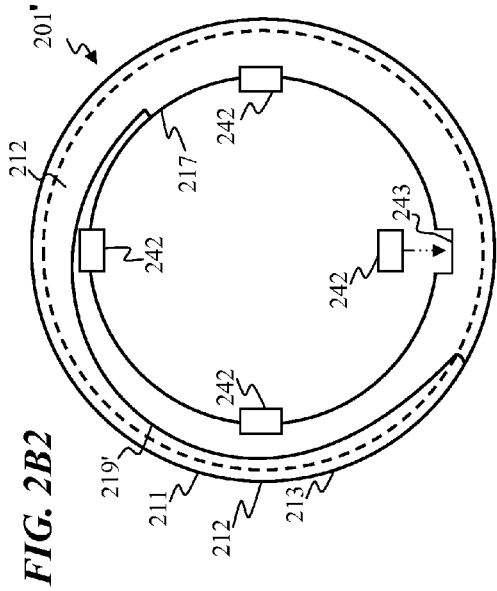
FIG. 2B2

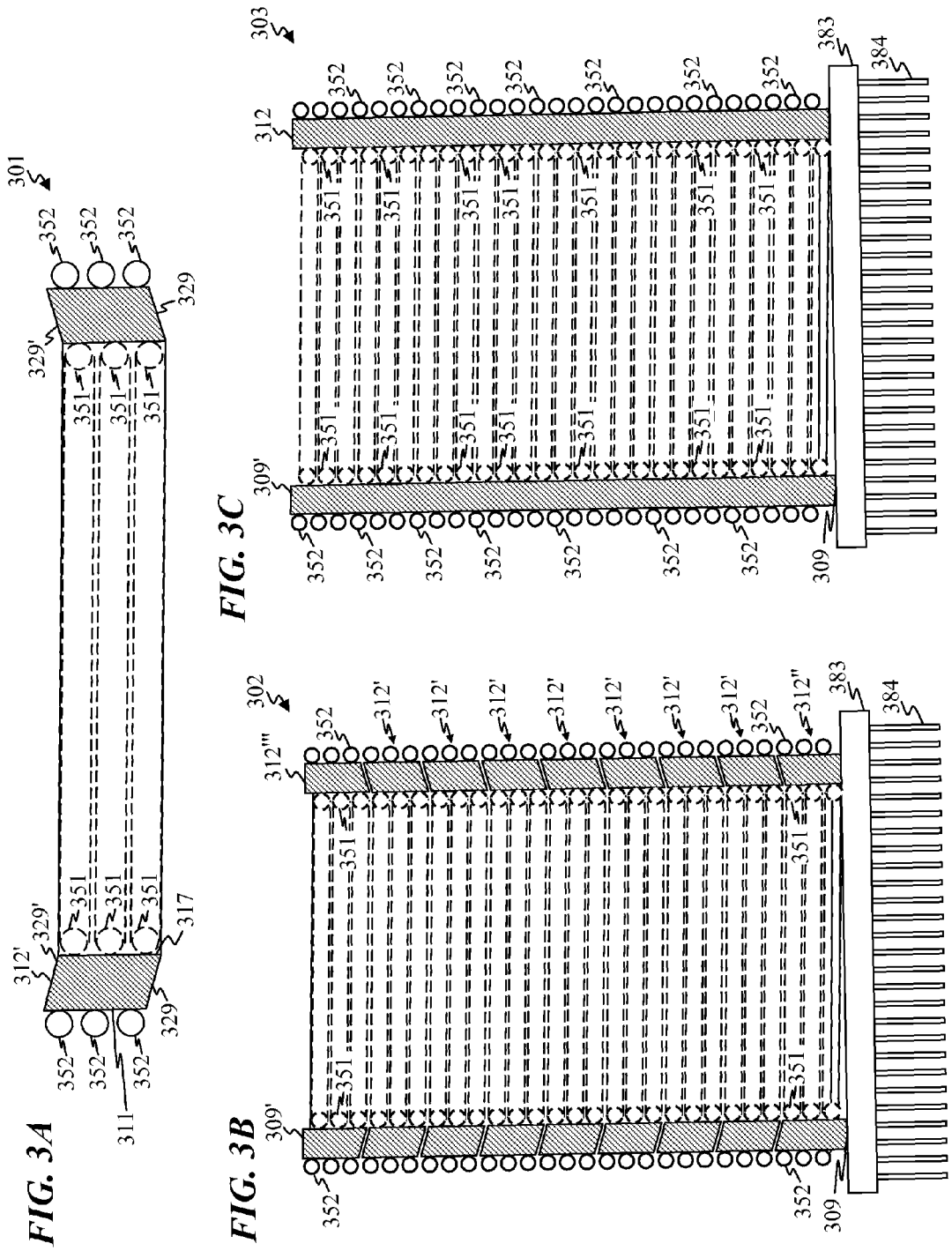

APPARATUS FOR OPTICAL FIBER MANAGEMENT AND COOLING

CROSS-REFERENCE TO RELATED APPLICATIONS

This invention claims benefit under 35 U.S.C. §119(e) of U.S. Provisional Patent Application No. 61/343,945 filed on Apr. 12, 2010, by Yongdan Hu and Eric C. Eisenberg, titled "APPARATUS FOR OPTICAL FIBER MANAGEMENT AND COOLING"; which is incorporated herein by reference in its entirety.

This invention is related to:

U.S. Pat. No. 6,456,756 issued Sep. 24, 2002, to Roy Mead, et al., titled "FIBER RAMAN AMPLIFIER PUMPED BY AN INCOHERENTLY BEAM COMBINED DIODE LASER";

U.S. Pat. No. 7,792,166 issued Sep. 7, 2010, to Lawrence A. Borschowa, titled "APPARATUS AND METHOD FOR DRIVING LASER DIODES";

U.S. Pat. No. 7,620,077 issued Nov. 17, 2009, to Angus J. Henderson, titled "APPARATUS AND METHOD FOR PUMPING AND OPERATING OPTICAL PARAMETRIC OSCILLATORS USING DFB FIBER LASERS";

U.S. Pat. No. 7,701,987 issued Apr. 20, 2010, to Matthias P. Savage-Leuchs et al., titled "APPARATUS AND METHOD FOR GENERATING CHIRP-SLICE CONTROLLED-LINEWIDTH LASER-SEED SIGNALS";

U.S. Pat. No. 7,471,705 issued Dec. 30, 2008, to David C. Gerstenberger and Mark S. Bowers, titled "ULTRAVIOLET LASER SYSTEM AND METHOD HAVING WAVELENGTH IN THE 200-NM RANGE";

U.S. Pat. No. 7,391,561 issued Jun. 24, 2008, to Fabio Di Teodoro and Christopher D. Brooks, titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD";

U.S. Pat. No. 7,430,352 issued Sep. 30, 2008, to Fabio Di Teodoro et al., titled "MULTI-SEGMENT PHOTONIC-CRYSTAL-ROD WAVEGUIDES FOR AMPLIFICATION OF HIGH-POWER PULSED OPTICAL RADIATION AND ASSOCIATED METHOD";

U.S. Pat. No. 7,379,648 issued May 27, 2008, to Christopher D. Brooks and Fabio Di Teodoro, titled "OPTICAL HOLLOW-CORE DELIVERY FIBER AND HOLLOW-END-CAP TERMINATION AND ASSOCIATED METHOD";

U.S. Pat. No. 7,386,211 issued Jun. 10, 2008, to Fabio Di Teodoro and Christopher D. Brooks, titled "METHOD AND APPARATUS FOR SPECTRAL-BEAM COMBINING OF MEGAWATT-PEAK-POWER BEAMS FROM PHOTONIC-CRYSTAL RODS";

U.S. Pat. No. 7,400,804 issued Jul. 15, 2008, to Fabio Di Teodoro et al., titled "MONOLITHIC OR RIBBON-LIKE MULTI-CORE PHOTONIC-CRYSTAL FIBERS AND ASSOCIATED METHOD";

U.S. Pat. No. 7,429,734 issued Sep. 30, 2008, to Steven C. Tidwell, titled "SYSTEM AND METHOD FOR AIRCRAFT INFRARED COUNTERMEASURES TO MISSILES";

U.S. Pat. No. 7,199,924 issued Apr. 3, 2007, to Andrew J. W. Brown et al., titled "APPARATUS AND METHOD FOR SPECTRAL-BEAM COMBINING OF HIGH-POWER FIBER LASERS";

U.S. Pat. No. 7,768,700 issued Aug. 3, 2010, to Matthias P. Savage-Leuchs, titled "METHOD AND APPARATUS FOR OPTICAL GAIN FIBER HAVING SEGMENTS OF DIFFERING CORE SIZES";

U.S. patent application Ser. No. 12/018,193 filed Jan. 22, 2008, by John D. Minelly and Deborah A. Alterman, titled "HIGH-ENERGY EYE-SAFE PULSED FIBER AMPLIFIERS AND SOURCES OPERATING IN ERBIUM'L-BAND" (which issued as U.S. Pat. No. 7,872,794 on Jan. 18, 2011);

U.S. patent application Ser. No. 12/169,628 filed Jul. 8, 2008, by John D. Minelly, titled "MICRO-STRUCTURED FIBER PROFILES FOR MITIGATION OF BEND-LOSS AND/OR MODE DISTORTION IN LMA FIBER AMPLIFIERS, INCLUDING DUAL-CORE EMBODIMENTS" (which issued as U.S. Pat. No. 7,924,500 on Apr. 12, 2011);

U.S. patent application Ser. No. 12/624,327 filed Nov. 23, 2009, by Roy D. Mead, titled "SPECTRALLY BEAM COMBINED LASER SYSTEM AND METHOD AT EYE-SAFER WAVELENGTHS" (which issued as U.S. Pat. No. 8,441,718 on May14, 2013);

U.S. Provisional Patent Application No. 61/263,736 filed Nov. 23, 2009, by Matthias P. Savage-Leuchs and Christian E. Dilley, titled "Q-SWITCHED OSCILLATOR SEED-SOURCE FOR MOPA LASER ILLUMINATOR METHOD AND APPARATUS";

U.S. Provisional Patent Application No. 61/253,041 titled "FIBER-PIGTAIL ISOLATOR WITH TAP PORTS FOR FORWARD AND BACKWARD OPTICAL SIGNAL MONITORING" filed on Oct. 19, 2009 by Tolga Yilmaz and Khush Brar; and U.S. patent application Ser. No. 12/854,868 filed on Aug. 11, 2010, by Tolga Yilmaz et al., titled "IN-LINE FORWARD/BACKWARD FIBER-OPTIC SIGNAL ANALYZER";

each of which is incorporated herein by reference in its entirety.

FIELD OF THE INVENTION

The invention relates generally to optical waveguides and more particularly to apparatus for accommodating, managing, and cooling optical-waveguide fiber in fiber lasers and fiber laser systems and methods thereof, wherein, in some embodiments, an optical fiber-management apparatus is manufactured from a heat-conductive material, and accepts and positions a plurality of loops of optical fiber on an interior surface of the optical-fiber-management apparatus and on an exterior surface of the fiber-management apparatus such that the fiber-management apparatus secures and cools approximately twice the length of optical fiber as a conventional fiber handler while also allowing the input location of the optical fiber and the output location of the optical fiber to be positioned in a plane at substantially the same end of the fiber-management apparatus. As used herein, the term fiber management includes holding, securing, guiding, and/or cooling an optical fiber.

BACKGROUND OF THE INVENTION

There is a lack of an effective, reliable and manufacturable device to manage and cool fiber-optic cable, especially gain fiber, in high-power fiber-laser application to keep lengths of optical fiber neatly arranged and secured as well as to prevent detrimental heating effects, such as dopant diffusion in the gain fiber. Existing devices for optical fiber management and cooling tend to have input and output fiber located at significantly different physical planes (i.e., on opposite ends of a cylindrical fiber-management device), which creates undesired fiber bending. Further, existing optical-fiber-management devices tend to lack features that effectively secure the optical fiber to the management unit and existing devices also tend to require significant space, which is undesirable when a long optical fiber needs to be managed.

U.S. Pat. No. 6,424,784 issued to Grieg A. Olson on Jul. 23, 2002, titled "GRATING COIL PACKAGE FOR REDUCED FIBER STRAIN," is incorporated herein by reference. Olson describes an apparatus and method for securing an optical fiber Bragg grating to a retaining element having a helical groove. In accordance with the method, an optical fiber Bragg grating is wrapped around the retaining element so that the optical fiber Bragg grating extends in and along the helical groove. An excess length of the optical fiber Bragg grating is provided in the helical groove to substantially alleviate tension exerted upon the optical fiber Bragg grating. The first and second ends of the fiber Bragg grating are affixed to the retaining element. The optical fiber apparatus and method described by Olson describes the optical fiber being looped around the outer surface of the apparatus and also requires that the optical fiber enter and exit the retaining element on different planes (i.e., the first end and second end of the fiber on the retaining element being in different parallel planes).

U.S. Pat. No. 7,400,812 issued to Martin Seifert on Jul. 15, 2008, titled "APPARATUS AND METHODS FOR ACCOMMODATING LOOPS OF OPTICAL FIBER," is incorporated herein by reference. Seifert describes an optical apparatus for accommodating optical fiber, such as one or more loops of optical fiber. The optical apparatus can include a body comprising an inwardly facing surface adapted for receiving a plurality of loops of a length of optical fiber. The body can include at least a portion wherein the inwardly facing surface is continuous between two adjacent loops. Methods and apparatus are described for disposing the optical fiber with an optical apparatus for accommodating the optical fiber. The optical fiber apparatus described by Seifert described the optical fiber being looped around the inner surface of the apparatus and also requires that the optical fiber enter the apparatus and exit the apparatus on different planes (i.e., the first end and second end of the cylinder being in different parallel planes).

A peer-reviewed journal article published in the Proceeding of SPIE, Volume 7195, pp. 71951U-71951U-11 (Photonics West 2009), authored by Marc-André Lapointe, et al. and titled "THERMAL EFFECTS IN HIGH-POWER CW FIBER LASERS" is incorporated in its entirety herein by reference. Lapointe et al. describe that the thermal degradation of double clad optical fiber coatings is known to be the prime limiting factor for the operation of high-power continuous-wave (CW) fiber lasers. In this paper, the authors conducted a study of thermal effects in high power CW fiber lasers. A particular focus was put on heating at the splice points and in the doped fiber due to the quantum defect in 100-W class CW fiber lasers. A theoretical model, and experimental measurements taken with a high resolution IR camera on 125- to 400-micron-diameter (125-400-micrometer-diameter) fibers, were presented. Thermal-contact resistance between the fiber and its heat sink were considered in the conduction heat-transfer model and measured for different geometries. Proper designs for cooling apparatus were proposed and optimization of the active fiber was discussed. Some predictions for power scaling and temperature management of fiber lasers to kilowatt (kW) power level were also described.

There is a need for an improved apparatus and associated method for handling, managing and cooling optical-waveguide fiber optic cable.

SUMMARY OF THE INVENTION

In some embodiments, the present invention provides a method for cooling an optical fiber. The method includes providing an optical-fiber-contact body having an inwardly facing surface and an outwardly facing surface on opposite sides of a heat-conductive material, wherein the outwardly facing surface includes a surface feature that determines a spacing of a plurality of loops of the optical fiber on the outward-facing surface, providing the optical fiber, guiding the fiber, from outside the optical-fiber-contact body at a first end of the optical-fiber-contact body, through or around the optical-fiber-contact body to the inwardly facing surface, looping the fiber such that a plurality of loops are in thermal contact with the inwardly facing surface of the optical-fiber-contact body. Successive loops are placed in a direction from the first end of the optical-fiber-contact body towards a second end of the optical-fiber-contact body. The method also includes guiding the fiber at the second end of the optical-fiber-contact body from the inwardly facing surface, through or around the optical-fiber-contact body from the inwardly facing surface to the outwardly facing surface; and winding the fiber in a plurality of loops in thermal contact with the outwardly facing surface of the optical-fiber-contact body such that successive loops are placed next to one another in a direction from the second end of the optical-fiber-contact body towards the first end of the optical-fiber-contact body.

In some embodiments, the present invention provides an apparatus for holding and cooling an optical fiber, wherein the apparatus includes an optical-fiber-contact body having an inwardly facing surface and an outwardly facing surface on opposite sides of a heat-conductive material, wherein the outwardly facing surface includes a surface feature that determines a spacing of a plurality of loops of the optical fiber. In some embodiments, some of the plurality of loops are spaced closer to one another (e.g., in some embodiments, touching one another), while others of the loops are spaced apart from one another (for example, in order to spread the heat load for those loops over a larger area).

BRIEF DESCRIPTION OF THE DRAWINGS

FIG. 1A1 is a side-view schematic block diagram of an optical-gain-fiber system 101, according to some embodiments of the invention.

FIG. 1A2 is a top-end-view schematic block diagram of an optical-gain-fiber system 101, according to some embodiments of the invention.

FIG. 1A3 is a top-end-view schematic block diagram of an optical-gain-fiber system 103, according to some embodiments of the invention.

FIG. 1B is a perspective-view diagram of fiber-management-and-cooling apparatus 110, according to some embodiments of the invention.

FIG. 1C is a top-end-view diagram of fiber-management-and-cooling apparatus 110, according to some embodiments of the invention.

FIG. 1D1 is a side-view diagram of fiber-management-and-cooling apparatus 110', according to some embodiments of the invention.

FIG. 1D2 is a side-view diagram of fiber-management-and-cooling apparatus 110", according to some embodiments of the invention.

FIG. 1D3 is a side-view diagram of fiber-management-and-cooling apparatus 110''', according to some embodiments of the invention.

FIG. 1E is a side-view diagram of a single stacking unit 105 of a fiber-management-and-cooling apparatus, according to some embodiments of the invention.

FIG. 1F is a top-end-view diagram of a single-piece split-ring fiber-management-and-cooling apparatus 106, according to some embodiments of the invention.

FIG. 1G is a top-end-view diagram of a two-piece-ring fiber-management-and-cooling apparatus 107, according to some embodiments of the invention.

FIG. 1H is a top-end-view diagram of an oblong fiber-management-and-cooling apparatus 108, according to some embodiments of the invention.

FIG. 2A1 is a perspective diagram of guiding-and-cooling element 201, according to some embodiments of the invention.

FIG. 2B1 is a top-end-view diagram of guiding-and-cooling element 201, according to some embodiments of the invention.

FIG. 2C1 is a side-view diagram of guiding-and-cooling element 201, according to some embodiments of the invention.

FIG. 2A2 is a perspective diagram of a guiding-and-cooling element 201', according to some embodiments of the invention.

FIG. 2B2 is a top-end-view diagram of guiding-and-cooling element 201'.

FIG. 2C2 is a side-view diagram of guiding-and-cooling element 201'.

FIG. 3A is a side-view diagram, partially in cross section, of a single stacking of a fiber-management-and-cooling apparatus 301 having an integrated tube thereon, according to some embodiments of the invention.

FIG. 3B is a side-view diagram, partially in cross section, of a fiber-management-and-cooling apparatus 302 having an integrated tube thereon and including a plurality of stacking units 401, according to some embodiments of the invention.

FIG. 3C is a side-view diagram, partially in cross section, of a fiber-management-and-cooling apparatus 303 formed from a single cylinder and having an integrated tube thereon, according to some embodiments of the invention.

DETAILED DESCRIPTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple figures. Signals and connections may be referred to by the same reference number or label, and the actual meaning will be clear from its use in the context of the description.

FIG. 1A1 is a side-view schematic block diagram of an optical-gain-fiber system 101, according to some embodiments of the invention. In the embodiments of FIG. 1A1 and FIG. 1A2, the fiber is described as being first guided to the inner surface, looped against that inner surface, then guided to the outer surface, looped against that outer surface. In other embodiments, the fiber is first guided to the outer surface, looped against that outer surface, then guided to the inner surface, looped against that inner surface. The final physical configuration is generally the same for either case.

FIG. 1A2 is an end-view schematic block diagram of optical-gain-fiber system 101, according to some embodiments of the invention. In some embodiments such as system 101 shown in FIG. 1A1 and FIG. 1A2, the signal light travels in a direction in the gain fiber such that the signal starts along the inner surface and after being amplified there travels in the gain fiber along the outer surface where it is further amplified. In some such embodiments, the pump light travels in a counter-propagating direction such that the highest power pump light and the highest power signal are located in the gain fiber 98 on the outer surface of guiding-and-cooling element 110 (equivalently, also called the optical-fiber-contact body 110). In some embodiments, the outer surface provides a greater surface area and thus provides a larger heat sink for the high power end of the gain fiber 98.

In other embodiments, such as system 103 of FIG. 1A3, the signal is introduced into the gain fiber such that it first travels along the outer surface of guiding-and-cooling element 110 and once partially amplified there travels along the inner surface of guiding-and-cooling element 110 where it is further amplified.

FIG. 1A3 is an end-view schematic block diagram of an optical-gain-fiber system 103, according to some embodiments of the invention. In some such embodiments, an air movement device, such as a fan 180, is provided to push or pull air through the center of guiding-and-cooling element 110 in order to improve cooling of that higher-power section of gain fiber 98.

Referring again to FIG. 1A1 and FIG. 1A2, in some embodiments, fiber-cable cooling-and-management system 101 includes an optical seed source 91 (such as a seed laser or narrow-band wavelength-filtered ASE source such as described in U.S. Pat. No. 7,701,987 titled "APPARATUS AND METHOD FOR GENERATING CHIRP-SLICE CONTROLLED-LINEWIDTH LASER-SEED SIGNALS," issued Apr. 20, 2010 to Matthias P. Savage-Leuchs et al., which is incorporated herein by reference). In some embodiments, the seed signal (i.e., light having a signal wavelength (the nominal central wavelength), and a linewidth) from source 91 is pre-amplified by an optical preamp 92, and the pre-amplified output light signal is optically coupled into gain fiber 98 (e.g., in some embodiments, an optical fiber having a core that is doped with a rare-earth dopant such as ytterbium, thulium, dysprosium, praseodymium, neodymium, samarium, europium, gadolinium, terbium, holmium, erbium, and/or other suitable dopant), and gain fiber 98 is optically coupled to output fiber 99. In some embodiments, the optical gain fiber 98 has multiple cladding layers including a pump cladding adjacent to the core that provides pump light that enters the core along its length, and an outer cladding that keeps the pump light confined within the outer diameter of the pump cladding. In some embodiments, pump light is launched into gain fiber 98 at one or both ends (when pump light is introduced by pump 97 at the left-hand end (relative to FIG. 1A1 and FIG. 1A2) and the pump light travels the same direction as the signal in the core, it is called co-propagating light, while when pump light is introduced by pump 97' at the right-hand end (relative to FIG. 1A1 and FIG. 1A2) and traveling in the opposite direction as the signal in the core, it is called counter-propagating light). When large amounts of pump light are used, there is a need to cool fiber 98, and thus the fiber is placed in intimate contact with guiding-and-cooling element 110, both along the inner surface of guiding-and-cooling element 110 and along its outer surface. The present invention also provides improved methods for loading and holding the fiber 98 against the surfaces of the guiding-and-cooling element 110.

In some embodiments, fiber-cable cooling-and-management system 101 is configured to guide an optical fiber 98 into the inside from the outside of the guiding-and-cooling element 110 (hereinafter, the guiding-and-cooling element 110 is also referred to as a "mandrel" or a "optical-fiber-contact body") by starting the fiber 98 from outside of the guiding-and-cooling element 110, directing the fiber 98 under or through a channel 119 in guiding-and-cooling element 110 such that the fiber 98 passes across or through the thickness of the guiding-and-cooling element 110 and starts looping along the inner surface of guiding-and-cooling element 110. In some embodiments, the fiber is looped around the inner surface of the guiding-and-cooling element 110 from a first end 109 (the lower end in FIG. 1A1) to a second end 109' (the upper end in FIG. 1A1) of the guiding-and-cooling element 110. In some embodiments, when the fiber 98 reaches the second end 109', the fiber is directed along a smooth curve from the inside surface of the guiding-and-cooling element 110 across or through a channel 119' in guiding-and-cooling element 110 such that the fiber 98 exits to be wound in loops around the outside surface of the guiding-and-cooling element 110. The cylindrical form and the smooth curve provide a bending radius for the loops that is substantially constant on the inside and transitions smoothly to a slightly larger substantially constant radius along the outside. In some embodiments, the index of refraction of the fiber is customized (as is described in U.S. patent application Ser. No. 12/169,628 filed Jul. 8, 2008, by John D. Minelly, titled "MICRO-STRUCTURED FIBER PROFILES FOR MITIGATION OF BEND-LOSS AND/OR MODE DISTORTION IN LMA FIBER AMPLIFIERS, INCLUDING DUAL-CORE EMBODIMENTS", which is incorporated herein by reference, and which issued as U.S. Pat. No. 7,924,500 on Apr. 12, 2011) to accommodate a specific curve geometry that matches the curve of the cooling element.

In some embodiments, after placement on the inner surface, the fiber 98 is then wound in a groove around the outside surface of the guiding-and-cooling element 110 from the second end 109' back towards the first end 109 where it is again in a substantially similar plane to where the fiber originally entered guiding-and-cooling element 110. In some embodiments, one or more clamps 108 are mounted on or next to guiding-and-cooling element 110 and used to secure fiber 98 to the sides of guiding-and-cooling element 110. In some embodiments, a thermally conductive compound (e.g., Matrix Thixotropic Premium Thermal Compound, Arctic Silver 5 or 7, or Céramique each available from Arctic Silver Incorporated, 9826 West Legacy Ave., Visalia, Calif. 93291; or Dow Corning's® SC102 thermally conductive compound, Dow Corning's® SE4490CV thermally conductive compound, Dow Corning's® 340 heat sink compound, each available from Dow Corning Corporation, PO Box 994, Midland, Mich. 48686; or Chomerics' CHO-THERM® 1641 and 1642 conductive silicone compounds available from Chomerics North America, Parker Hannifin Corp., 77 Dragon Court, Woburn, Mass. 01801) is applied and used to improve heat flow between the fiber and the guiding-and-cooling element 110.

In some embodiments, the present invention provides an effective, practical and economical solution for managing and cooling optical fiber 98 and the like, and finds benefit in at least the areas of optical components, photonics, optical computing, and the like. In some embodiments, the present invention provides a continuous-groove design on both the inside and outside of a single cylinder while having adjustable-tension clamps 108 to secure fiber 98 in grooves.

By designing features that guide the fiber into the inside of the guiding-and-cooling element 110 at one end 109 of the element 110, and then guide the fiber out of element 110 on the opposite end 109' of the element 110, and come back along the outside of element 110 to its starting end 109, while optionally using one or more clamps 108 mounted on or near element 110 to secure the fiber 98 from the sides, this system 101 resolves many of the problems that exist with conventional fiber-management apparatus.

In some embodiments, good fiber management and fiber cooling is important for ensuring that a high-power fiber-laser-based product is technologically and commercially successful and the present invention provides methods, apparatus, and systems for successful fiber management and cooling.

In some embodiments, the present invention provides an optical-gain-fiber system 101 that includes an inwardly facing surface having a groove configured to receive a plurality of loops of optical fiber 98 and an outwardly facing surface having a groove configured to receive a plurality of loops of optical fiber 98, wherein the system is useful for fiber management and fiber cooling. In some embodiments, the fiber is secured in the grooves using one or more clips 108 to hold the fiber 98 to element 110 in a substantially stress-free or stress-reduced manner. In some other embodiments, the fiber 98 is secured to element 110 using a mating body to partially or completely enclose the fiber and promote additional cooling. In yet other embodiments, a helical metal tube is soldered, welded, swaged, wedged or otherwise secured to the inside surface of the fiber-management system, or to the outside surface of element 110, or to both the inside and the outside of element 110, and the optical fiber 98 is "threaded" through the helical metal tube, the metal tube acting to manage, cool, and protect the fiber 98 from mechanical damage, and to secure the fiber 98 to element 110.

FIG. 1B is a perspective view of guiding-and-cooling element 110 shown as part of system 101 in FIG. 1A1 and FIG. 1A2, and system 103 of FIG. 1A3, according to some embodiments of the invention. In some embodiments, guiding-and-cooling element 110 includes a substantially cylindrical body (or cylinder) 112 (e.g., in some embodiments, it is made of a thermally conductive metal such as silver, aluminum, or copper, or an alloy of two or more suitable elements) having an outer-facing surface 111 and an inner-facing surface 117. In some embodiments, outer-facing surface 111 has an outer-facing-surface radius $R_o$ and inner-facing surface 117 has an inner-facing-surface radius In some embodiments, the inner-facing surface 117 includes a continuous inner groove 115 that coils (this can alternatively be considered travels, wraps, spirals, or loops) around the inner-facing surface 117 from the first end 109 to the second end 109' of the cylinder 112. In some embodiments, the continuous inner groove 115 spirals around the inner-facing surface 117 from a first end to a second end in a right-hand-screw clockwise direction and in other embodiments, the continuous inner groove 115 spirals in the opposite or counter-clockwise direction. In some embodiments, the distance between successive loops of continuous inner groove 115 is substantially fixed. In some embodiments, the distance is selected such that the successive fiber loops are each in contact with their adjacent fiber-loop neighbors. In other embodiments, the distance is selected such that the successive fiber loops are spaced apart from their adjacent fiber-loop neighbors. In some embodiments, the outer-facing surface 111 includes a continuous outer groove 113 recessed into the outer-facing surface 111 that coils around the outer-facing surface 111 from the first end 109 of the cylinder 112 to the second end 109' of the cylinder 112. In some embodiments, the continuous outer groove 113 spirals around the outer-facing surface 111 from the second end to the first end in a left-hand-screw clockwise direction (e.g., in the same clockwise direction as the inner spiral but in the opposite screw direction since the direction of successive loops is toward the first end) and in some other embodiments, the continuous groove 113 spirals in the opposite or counter-clockwise direction. In some embodiments, the bottom of groove 113 is rounded as shown in the present figures; however, in other embodiments, a V-shaped groove bottom or other shaped grooves are used.

FIG. 1C is an end-view block diagram of guiding-and-cooling element 110, according to some embodiments of the invention.

FIG. 1D1 is a side-view block diagram of guiding-and-cooling element 110', according to some embodiments of the invention. In some embodiments, guiding-and-cooling element 110' includes a substantially cylindrical body (or cylinder) 112 (e.g., in some embodiments, made of a thermally conductive metal such as silver, aluminum, or copper, or an alloy of two or more suitable elements) having an outer-facing surface 111 and an inner-facing surface 117. In some embodiments, outer-facing surface 111 has an outer-facing-surface radius $R_o$ and inner-facing surface 117 has an inner-facing-surface radius $R_i$. In some embodiments, the inner-facing surface 117 includes a continuous inner groove 115 that coils (this can alternatively be considered travels, wraps, spirals, or loops) around the inner-facing surface 117 from the first end 109 to the second end 109' of the cylinder 112. In some embodiments, the continuous inner groove 115 spirals around the inner-facing surface 117 in a clockwise direction and in other embodiments, the continuous inner groove 115 spirals in a counter-clockwise direction. In some embodiments, the distance between successive loops of continuous inner groove 115 is substantially fixed. In some embodiments, the distance is selected such that the successive fiber loops are each in contact with their adjacent fiber-loop neighbors. In other embodiments, the distance is selected such that the successive fiber loops are spaced apart from their adjacent fiber-loop neighbors. In some embodiments, the substantially fixed distance between successive loops is between about 0.1 mm and about 50 mm, or about 0.1 mm, about 0.15 mm, or about 0.2 mm, about 0.25 mm, or about 0.3 mm, about 0.35 mm, or about 0.4 mm, or about 0.5 mm, or about 0.6 mm, or about 0.7 mm, or about 0.8 mm, or about 0.9 mm or about 1 mm, or about 2 mm, or about 3 mm, or about 4 mm, or about 5 mm, or about 6 mm, or about 7 mm, or about 8 mm, or about 9 mm, or about 10 mm, or about 11 mm, or about 12 mm, or about 13 mm, or about 14 mm, or about 15 mm, or about 16 mm, or about 17 mm, or about 18 mm, or about 19 mm, or about 20 mm, or about 22 mm, or about 24 mm, or about 26 mm, or about 28 mm, or about 30 mm, or about 35 mm, or about 40 mm, or about 45 mm, or about 50 mm. In some embodiments, the distance between successive loops of continuous groove 115 is in a range between two of the above-listed distances. In some other embodiments, the distance between successive loops of continuous groove 115 varies along the length of the cylinder 112, for example such that those portions of the fiber having the highest heat load (e.g., near the end(s) having the highest amount of pump light) are spaced further from one another than other portions having lower heat loads (e.g., in the middle or far end relative to the pump-light launch end(s)). In some embodiments, this selected distance between successive fiber loops is selected from the range of between about 0.1 mm and about 10 mm.

In some embodiments, the outer-facing surface 111 includes a continuous outer groove 113 recessed into the outer-facing surface 111 that coils around the outer-facing surface 111 from the first end 109 of the cylinder 112 to the second end 109' of the cylinder 112. In some embodiments, the continuous outer groove 113 spirals around the outer-facing surface 111 in a clockwise direction and in some other embodiments, the continuous groove 113 spirals in a counter-clockwise direction. In some embodiments, the distance between successive loops of continuous outer groove 113 is substantially fixed. In some embodiments, this fixed distance is between about 1 mm and about 50 mm, or about 1 mm, or about 2 mm, or about 3 mm, or about 4 mm, or about 5 mm, or about 6 mm, or about 7 mm, or about 8 mm, or about 9 mm, or about 10 mm, or about 11 mm, or about 12 mm, or about 13 mm, or about 14 mm, or about 15 mm, or about 16 mm, or about 17 mm, or about 18 mm, or about 19 mm, or about 20 mm, or about 22 mm, or about 24 mm, or about 26 mm, or about 28 mm, or about 30 mm, or about 35 mm, or about 40 mm, or about 45 mm, or about 50 mm. In some other embodiments, the distance between successive loops of continuous outer groove 113 is selected such that portions of the fiber passing higher amounts of pump light are spaced further apart along the length of the cylinder 112. In some embodiments, this selected distance between successive fiber loops is selected from the range of between about 1 mm and about 50 mm.

In some embodiments, guiding-and-cooling element 110' further includes a first external interface 119 located on the first end 109 of the cylinder 112 and is configured to accept and pass an optical fiber from the region outside of the cylinder 112 to the inner-facing surface 117 and into the continuous inner groove 115 of the cylinder 112. In some embodiments, guiding-and-cooling element 110' further includes a cylinder-end internal-to-external fiber-transition interface 119' located on the second end 109' of the cylinder 112 and is configured to direct an optical fiber from the inner-facing surface 117 and the continuous inner groove 115 to the outer-facing surface 111 and into the continuous outer groove 113.

In some embodiments, guiding-and-cooling element 110' further includes at least one heat sink 183 (e.g., that is/are attached to one or both of first end 109 and second end 109' of cylinder 112, and/or attached to the inner surface 117 and/or the outer surface 111) and is/are configured to improve the cooling ability and heat transfer out of cylinder 112.

FIG. 1D1 is a side-view diagram of fiber-management-and-cooling apparatus 110', according to some embodiments of the invention, that has its heat sink 183 attached to an end of cylinder 112.

FIG. 1D2 is an end-view diagram of a fiber-management-and-cooling apparatus 110'', according to some embodiments of the invention, that has its heat sink 181 attached to the outer surface 111 of cylinder 112.

FIG. 1D3 is a top-end-view diagram of a fiber-management-and-cooling apparatus 110''', according to some embodiments of the invention, that has its heat sink 182 attached to inner surface 117 of cylinder 112. In some embodiments, a fan 180 is also provided to move air across inner heat sink 182. In some embodiments, the present invention uses a plurality of heat sinks (on the inner surface 117, outer surface 111, first end 109, and/or second end 109') each attached to cylinder 112, and optionally one or more fans blowing air across the plurality of heat sinks In some embodiments, cylinder 112 is made of a metal (such as copper, silver, aluminum or an alloy of two or more suitable elements). In some embodiments, heat sink 183 further includes heat fins 184 to provide additional surface area to further cool cylinder 112. In some embodiments, a mounting surface 90 is provided, onto which a plurality of electronic (e.g., power supplies, timers, controllers, and the like) and/or other optical components (e.g., seed sources, optical preamplifiers, delivery fibers, beam steering devices, and the like) are mounted. In some embodiments, heat sink 183 is mounted to a face of mounting surface 90 opposite cylinder 112. In some embodiments, an additional heat sink 183 is also affixed to the opposite end 109'. In some embodiments, heat sink 183 uses an active cooling technique (e.g., via one or more heat pipes and/or coolant-circulating tubes 186, only one of which is shown passing though the cylinder 112 in FIG. 1D1; however, in some embodiments, one or more additional passes of pipe(s) 186 are embedded (e.g., through holes drilled, molded or punched through the cylinder 112), for example, in a direction parallel to the central axis of cylinder 112) to further improve heat transfer from guiding-and-cooling element 110'. In some such embodiments, the heat pipes include conventional internal construction including a liquid that evaporates at a hotter location, condenses in a cooler location in the pipe, and is carried back to the hotter location via wicking action of a fibrous material. In some other embodiments, a liquid coolant is pumped through coolant-circulating tubes, wherein the coolant transports heat from the cylinder 112 to a remote location where the coolant conducts the heat to, for example, the external environment. In yet other embodiments, guiding-and-cooling element 110' further includes one or more active cooling structures (e.g., in some embodiments, these includes heat pipes 186 such as are commonly used in heat sinks for processors in personal computers (such as used in Thermaltake MaxOrb CL-P0369 120 mm CPU Cooler available from Thermaltake Technology Inc. USA, 525 Parriott Place, City of Industry, Calif. 91745 or Scythe Mugen-2 Rev. B SCMG-2100 Quiet CPU Cooler available from Scythe, 14335 E. Don Julian Road, City of Industry, Calif. 91746) and the like) embedded within, or affixed to, the guiding-and-cooling element (optical-fiber-contact body) 110' to improve heat transfer from the pumped optical fiber 98.

In some embodiments, guiding-and-cooling element 110 is constructed or formed from a single piece of heat-conductive material using standard milling, pressing, stamping, and/or casting, or other suitable forming methods. In some other embodiments, guiding-and-cooling element 110 is formed from a plurality of initially separate stacking units, which, when combined by stacking one on top of the other, form guiding-and-cooling element 110.

FIG. 1E is a side-view block diagram of a single stacking unit 105 (also described herein as an "optical-fiber-contact section") of fiber-management-and-cooling apparatus 110, according to some embodiments of the invention. In some embodiments, a plurality of stacking units 105 form building blocks that can be used singly or in two or more stacked groups to form fiber-management-and-cooling apparatus 110. In some embodiments, the number of stacking units 105 used to form guiding-and-cooling element 110 is determined by the length of the optical fiber 98 that requires cooling and management.

FIG. 1F is an end-view diagram of a single-piece split-ring fiber-management-and-cooling apparatus 106, according to some embodiments of the invention. In some embodiments, apparatus 106 includes a generally cylindrical body 112' that can be used in place of cylinder 112 in system 101, but (unlike cylinder 112 described above) body 112' has a slot 190, which, in some embodiments, eases fabrication or assembly of system 101. In some embodiments, slot 190 helps compensate for thermal expansion and contraction of cylindrical body 112' and the optical fiber 98 by allowing the ring to flex and the outer circumference to expand and contract.

FIG. 1G is an end-view diagram of a two-piece-ring fiber-management-and-cooling apparatus 107, according to some embodiments of the invention. In some embodiments, apparatus 107 includes a generally cylindrical body 112" formed from a plurality of sections (in this case, sections 112A and 112B, each forming an approximately 180-degree portion) that can be used in place of cylinder 112 in system 101, but (unlike cylinder 112 described above) body 112" has a plurality of joints 191, which, in some embodiments, eases fabrication or assembly of system 101. In other embodiments, body 112" is formed using a larger number of sections, and/or differently sized portions.

FIG. 1H is an end-view diagram of an oblong fiber-management-and-cooling apparatus 108, according to some embodiments of the invention. In some embodiments, apparatus 108 includes a generally oblong body 112''' (or other body having a curved form with an inner surface and an outer surface) that can be used in place of cylinder 112 in system 101, but (unlike cylinder 112 described above) body 112''' has extended-length flattened center portion 192 on each of one or more sides (in the embodiment shown on two sides, but in other embodiments, on one side or three or more sides), which, in some embodiments, facilitates achieving a particular footprint or shape of system 101.

FIG. 2A1 is a perspective view of guiding-and-cooling element 201, according to some embodiments of the invention.

FIG. 2B1 is an end-view block diagram of guiding-and-cooling element 201.

FIG. 2C1 is a side-view block diagram of guiding-and-cooling element 201. In some embodiments, guiding-and-cooling element 201 is configured to manage and cool an optical fiber and is substantially similar to guiding-and-cooling element 110, except that guiding-and-cooling element 201 does not have a continuous inner groove as guiding-and-cooling element 110 does. Rather, in some embodiments, guiding-and-cooling element 201 includes a plurality of protruding fiber guides 241 that are configured to direct and guide an optical fiber that is looped or coiled around the inner-facing surface 217 and to manage the successive loops of the optical fiber. In some embodiments, the guides 241 extend toward the volume enclosed by inner surface 217. In some embodiments, a plurality of the protruding fiber guides 241 have three perpendicular edges that define an area that is substantially rectangular in shape, and/or two edges that define an area that is substantially triangular in shape, and/or a curved edge that defines an area that is semi-circular in shape, and/or are any such shape that is suitable for directing and guiding an optical fiber around the inner-facing surface 217 of guiding-and-cooling element 201. In some embodiments, guiding-and-cooling element 201 includes cylinder 212. In some such embodiments, each of the guides has a surface that is substantially perpendicular to a central axis of cylinder 212. In some embodiments, these guides are formed on the surface of a separate and removable guide structure that is slid into slots formed into cylinder 212. Such removable guide structures facilitate fabrication of cylinder 212.

FIG. 2A2 is a perspective diagram of a guiding-and-cooling element 201', according to some embodiments of the invention.

FIG. 2B2 is an end-view diagram of guiding-and-cooling element 201'.

FIG. 2C2 is a side-view diagram of guiding-and-cooling element 201'. Note that guiding-and-cooling element 201' is substantially similar to guiding-and-cooling element 201 once the four removable and insertable grooved elements 242 are loaded into slots 243. In some embodiments, the present invention includes a method wherein the gain fiber 98 is first loaded in a spiral geometry against the plurality of grooved elements 242, and these are then slid into place into slots 243, and the fiber 98 is released to relax and expand until it is in intimate contact with inner surface 217. In other embodiments, the plurality of grooved elements 242 are first slid into place into slots 243, and then the fiber 98 is placed in the grooves of grooved elements 242 and along inner surface 217 inside cylinder 212.

In some embodiments, the outer-surface 211 of guiding-and-cooling element 201 (or guiding-and-cooling element 201') includes a continuous groove 213 recessed into the outer-facing surface 211 that coils around the outer-facing surface 211 from the first end 209 of the cylinder 212 to the second end 209' of the cylinder 212. In some embodiments, cylinder 212 is made of a metal (such as copper, silver, aluminum or an alloy of two or more suitable elements). In some embodiments, the continuous outer groove 213 spirals around the outer-facing surface 211 in a clockwise direction and in some other embodiments, the continuous groove 213 spirals in a counter-clockwise direction. The other aspects and geometry of groove 213 are substantially equivalent to groove 113 described above.

In some embodiments, guiding-and-cooling element 201 (or guiding-and-cooling element 201') is used in a substantially similar manner as guiding-and-cooling element 110 as set forth above, including guiding an optical fiber into the inside of the guiding-and-cooling element 201 by starting the fiber from outside of the guiding-and-cooling element 201, directing the fiber under or through a channel 219 in guiding-and-cooling element 201 such that the fiber passes across or through the thickness of the guiding-and-cooling element 201 and starts looping along the inner surface 217 of guiding-and-cooling element 201. In some embodiments, the fiber is looped around the inner surface 217 of the management apparatus from a first end 209 to a second end 209' of the guiding-and-cooling element 201. In some embodiments, when the fiber 98 reaches the second end 209', the fiber is directed from the inside surface of the guiding-and-cooling element 210 across or through a channel 219' in guiding-and-cooling element 201 such that the fiber exits to be wound in loops around the outside surface 211 of the guiding-and-cooling element 201.

In other embodiments, fiber 98 is looped within a grooved jig (not shown, but substantially similar to the insertable partially grooved elements 242 described above), and this jig and looped fiber 98 are inserted into cylinder 212, the grooved elements rotated so that no grooves of the jig face the fiber and the jig is removed, thus allowing the fiber to relax and expand to contact the grooves of the interior of the cylinder 112 or 212.

In some embodiments, once in place on the interior of cylinder 112 or 212, the fiber is then wound in a groove around the outside surface of the guiding-and-cooling element 201 (or guiding-and-cooling element 201') from the second end 209' back towards the first end 209 where it is again in a plane substantially similar to where the fiber originally entered guiding-and-cooling element 201 (guiding-and-cooling element 201').

In some embodiments, guiding-and-cooling element 201 (or guiding-and-cooling element 201') further includes heat sink 283 that is attached to the first end 209 of the cylinder 212 and is configured to improve the cooling ability and heat transfer out of the cylinder 212. In some embodiments, heat sink 283 further includes heat fins 284 to provide additional surface area to further cool cylinder 212. In some embodiments, heat pipes and fans, as described above, are provided to improve heat transfer and to push/pull air over the heat sink 283 and fins 284.

FIG. 3A is a side-view block diagram, partially in cross section, of single stacking unit 301 of a guiding-and-cooling element having an integrated tube thereon, according to some embodiments of the invention. In some embodiments, a plurality of stacking units 301 can be stacked together to form a cylinder 302 as shown in FIG. 3B (in a manner similar to stacking a plurality of stacking units 105 (of FIG. 1E) to form a cylinder 110' (as shown in FIG. 1D1)). In some embodiments, each stacking unit 301 includes a heat-conducting cylinder 312' having an inner-facing surface 317 and an outer-facing surface 311, an inner integrated tube 351 attached or formed on the inner-facing surface 317 and an outer integrated tube 352 attached or formed on the outer-facing surface 311. In some embodiments, inner integrated tube 351 loops around the inner-facing surface 317 as a plurality of loops in a spiral manner (e.g., in some embodiments, inner integrated tube 351 loops in a substantially helical manner) and inner integrated tube 351 is configured to accept and guide an optical fiber (e.g., gain fiber 98 described above) through inner integrated tube 351 such that the optical fiber is cooled, protected against abrasion or assembly damage, and kept orderly. In some embodiments, outer integrated tube 352 loops around the outer-facing surface 311 as a plurality of loops in a spiral manner (e.g., in some embodiments, outer integrated tube 352 loops in a substantially helical manner) and outer integrated tube 352 is also configured to accept and guide optical fiber 98 through outer integrated tube 352 such that the optical fiber is cooled, protected against abrasion or assembly damage, and kept orderly. In some embodiments, inner integrated tube 351 and outer integrated tube 352 is made from a heat conductive material (e.g., copper, or aluminum, or silver, or a compound material that includes one or more heat conductive materials, or the like). In some embodiments, the inner tube 351 or the outer tube 352 are omitted or replaced by grooves as described above (e.g., in some embodiments, perhaps only an outer tube 352 is required to protect the gain fiber 98).

FIG. 3B is a side-view block diagram, partially in cross section, of a guiding-and-cooling element 302 being formed from a plurality of identical stacking units 312' sandwiched end-to-end between a first transitional stacking-unit end 312" and a second transitional stacking-unit end 312''', according to some embodiments of the invention. In some embodiments, the guiding-and-cooling element 302 (also called the optical-fiber-contact body 302) includes a second transition end section 312''' having a transition groove to guide the fiber between the outwardly facing surface 311 and the inwardly facing surface 317; a first transition end section 312" having a transition groove to guide the fiber between the inwardly facing surface 317 and the outwardly facing surface 311; and zero or more (e.g., in some embodiments as shown, a plurality of) substantially identical optical-fiber-contact sections 312' attached end-to-end to one another and to the first transition end section 312" and the second transition end section 312'''.

In some embodiments, the apparatus further includes a heat sink 383 (having a plurality of fins 384), the heat sink 383 being attached to the first transition end section 312″ of guiding-and-cooling element 302 (also called the optical-fiber-contact body 302). In some embodiments, the opposite-end surfaces 329 and 329′ (e.g., the bottom and top surfaces) of each intermediate heat-conducting cylinder 312′ are tapered (i.e., they are not perpendicular to outwardly facing surface 311 or the inwardly facing surface 317) or otherwise shaped to provide self-aligning stacking unit sections. The top surface of single stacking unit 301 first transition end section 312″ and the bottom surface of second transition end section 312′″ are also tapered accordingly.

In some embodiments, guiding-and-cooling element 302 is configured to manage and cool a length of optical fiber 98 in a manner substantially similar to element 110, or element 110′, or element 110″, or element 110′″, or element 103, or element 105, and/or guiding-and-cooling element 201 or guiding-and-cooling element 201′ described above, except that guiding-and-cooling element 302 is formed by stacking a plurality of stacking units 301 adjacent one another, each including inner integrated tube 351 and/or outer integrated tube 352. In some embodiments, stacking units 301 are stacked such that each of their respective inner integrated tubes 351 and outer integrated tubes 352 are aligned with corresponding features of the adjacent stacking unit to permit an optical fiber to be guided through the inner integrated tube 351 from the first end 309 of guiding-and-cooling element 302 to the second end 309′ of guiding-and-cooling element 302 and then to be guided through outer integrated tube 352 from the second end 309′ and back to the first end 309 guiding-and-cooling element 302. In some embodiments, a transfer tube (not shown in FIG. 3B) is provided at the second end 309′ to facilitate the transition from the inner integrated tube 351 to the outer integrated tube 352.

FIG. 3C is a side-view block diagram, partially in cross section, of a guiding-and-cooling element 303 formed from a single heat-sink cylinder and having an integrated tube thereon, according to some embodiments of the invention. In some embodiments, guiding-and-cooling element 303 is substantially similar to guiding-and-cooling element 302 described above in FIG. 3B, except that guiding-and-cooling element 303 is formed from a single heat-conducting cylinder 312 with a single continuous inner tube 351 and a single continuous outer tube 352 instead of being formed by a plurality of stacking units as described for guiding-and-cooling element 302. In other embodiments, a single cylinder is used, but a plurality of tubes are used on the inner and/or outer surface.

In some embodiments, guiding-and-cooling element 302 and/or guiding-and-cooling element 303 further include a heat sink 383 that is attached to the first end of the cylinders 312′ and 312, respectively, and is configured to improve the cooling ability and heat transfer out of the cylinders 312′ and 312, respectively. In some embodiments, cylinders 312′ and 312 are made of a metal (such as copper, silver, aluminum or an alloy of two or more suitable elements). In some embodiments, heat sink 383 further includes heat fins 384 to provide additional surface area to further cool cylinder assembly 312′-312″-312′″ and cylinder 312, respectively. In some embodiments, a heat sink is also or alternatively provided on the inner surface, outer surface, or opposite end 309′ of cylinder 312 or cylinder assembly 312′-312″-312′″ (in a manner as set forth above in the description of FIG. 1D2 and FIG. 1D3).

In some embodiments, a thermally conductive compound is used to enhance the heat transfer between the optical fiber and the guiding-and-cooling element (as described above). In some embodiments, the thermally conductive compound is applied to fill or partially fill the grooves or tubes in the inwardly facing surface and/or the outwardly facing surface (e.g., in some embodiments, by using a "caulk-gun-like" applicator or other suitable device for providing an amount of thermally conductive compound or by spreading the thermally conductive compound using a "spatula-type" implement to apply the compound and then remove excess compound) before the optical fiber is looped around the inner surface and/or wound around the outer surface of the guiding-and-cooling element. In some other embodiments, the thermally conductive compound is applied after the optical fiber has been looped around the inner surface and/or wound around the outer surface of the guiding-and-cooling element.

In some embodiments, using the helical tube (made of metal or other suitable thermally conductive material) attached to the inner surface and/or outer surface of the guiding-and-cooling element, a "grease gun"-type apparatus is used to fill the tubing with thermally conductive compound by forcing the thermally conductive compound into the tube to improve the transfer of heat generated by the optical fiber to the guiding-and-cooling element, and to increase the capacity and rate of heat transfer. In some embodiments, the optical fiber is threaded through the tubing prior to filling the tube with the thermally conductive compound. In some other embodiments, the tube is filled with the thermally conductive compound and following the filling of the tube with compound, the optical fiber is threaded or guided through the compound-filled tube.

In some embodiments, the thermally conductive compound is a silicone-containing or epoxy-containing adhesive compound that cures in place is used as a flexible heat-conductive material and is used in the present invention to provide additional support for the optical fiber, and in some embodiments, the cured thermally conductive compound is used to secure the optical fiber in the grooves and/or used to form grooves or tubes on the fiber along the inner and/or outer surface of the guiding-and-cooling element.

In some embodiments, the spacing of the groove or metal tube on the inner surface and/or the groove or metal tube on the outer surface of the guiding-and-cooling element of the present invention has a distance between the grooves or tubes that is substantially equal (i.e., the distance between a first groove and a second groove located immediately adjacent to the first groove in a direction that is substantially perpendicular to the direction the optical fiber is looped around the inner surface and/or wound around the outer surface is substantially the equal) along the height of the guiding-and-cooling element. In some other embodiments, the spacing between adjacent grooves or metal tubing is determined by the amount of power passing through the portion of the optical fiber. For example, in some embodiments, if the optical fiber generates a significant amount of heat in a first portion of the fiber, then the fiber-management system will have a first groove spacing or tube spacing, corresponding to the first portion of the optical fiber, that is greater than the second groove spacing or tube spacing, corresponding to the second, less-heat generating, portion of the optical fiber. In some embodiments, the varied, modifiable, and/or variety of groove spacing or tube spacing allows for tailoring the heat-transfer characteristics of the guiding-and-cooling element for each optical fiber system's individual needs.

In some embodiments, the radius of the guiding-and-cooling element cylinder of the present invention is selected according to the fiber-cross-section diameter (thickness) and numerical aperture of the optical fiber that is being looped and/or wound around the fiber-management system. For example, an optical fiber having a larger core radius and/or a lower numerical aperture may require a large-diameter cylinder in order to accommodate the stiffness of the fiber (smaller diameter fibers may bend more easily) and/or to avoid light leaking from the core (higher numerical aperture core (NA) can generally be more tightly curved or bent without light leaking out as compared to lower-NA core). In some embodiments, a plurality of guiding-and-cooling element cylinders are provided and a first cylinder having a smaller first radius is concentrically located within a second cylinder having a larger second radius that is larger than the first radius of the first cylinder and is large enough such that the first cylinder can fit (e.g., concentrically) inside the second cylinder. Such a "Russian-doll" arrangement of multiple fiber-management system cylinders reduces the footprint required for the high-power laser system. In other embodiments, rather than using a single longer guiding-and-cooling element cylinder, a plurality of shorter guiding-and-cooling element cylinders are provided and a first cylinder is placed side-by-side and parallel to a second cylinder, both mounted to a common mounting surface (such as mounting surface 90 shown in FIG. 1D1). Such a "N-gun" arrangement of multiple fiber-management system cylinders reduces the axial dimension ("height," with respect to the side-view figures herein) required for the high-power laser system.

In some embodiments, the present invention allows for optical fiber to be looped on both the inner surface and the outer surface of the guiding-and-cooling element. Accordingly, the present invention has the advantage of having both the input fiber and the output fiber of the guiding-and-cooling element on substantially the same plane, which is a strong advantage in protecting the fiber and releasing fiber stresses otherwise created through fiber routing and bending that would occur in routing the fiber from the second end of a conventional configuration using a cylinder (such as described in U.S. Pat. No. 6,424,784 and U.S. Pat. No. 7,400,812) attached to a mounting surface, wherein a fiber, starting in the plane of the face of the mounting surface, and looped from the first end of the inner surface of the cylinder exits at the second end and then must be extended somehow in a flying-fiber manner to again reach the face of the mounting surface. Further, the present invention can accommodate different fiber lengths in a single unit with an easy adjustment of the fiber-securing clip position (and/or by selecting an appropriate number of stacking units to form the desired length for the guiding-and-cooling element), and the guiding-and-cooling element also accommodates twice as much fiber as conventionally designed fiber managers.

In some embodiments, the present invention is beneficial for defense industry uses, industrial uses, and medical uses, and the like, that use and benefit by employing fiber lasers, including high-power fiber lasers and laser systems. In some embodiments, the present invention is configured for use in fiber laser systems for solar-panel machining, surgery or other medical therapy (such as, for example, BPH (benign prostatic hypertrophy) medical treatment), high-power fiber-laser weaponry, laser materials processing, laser welding or cutting, and the like.

In some embodiments, the present invention provides a heat-sink and fiber-management apparatus having closed (or nearly closed) curved body with an inwardly facing surface having at least one groove that guides the fiber so the fiber extends and/or spirals toward a second end from a first end and at least one outwardly facing second groove that guides the fiber so the fiber extends or spirals toward the first end from the second end along the outwardly facing surface. In some embodiments, a smooth-curve groove or opening (e.g., reference 119) extends along or through the first end (e.g., reference 109) of the body (e.g., reference 112) from the outwardly facing surface toward the inwardly facing surface (e.g., to one end of the first inner groove) to accommodate the fiber as it transitions (e.g., along the mounting surface) from the first end of the outwardly facing surface to the first end of the inwardly facing surface. The fiber then loops along the inner surface and then extend along or through a smooth-curve groove or opening (e.g., reference 119') at the second end (e.g., reference 109') of the body from the inwardly facing surface 117 toward the outwardly facing surface 111 (e.g., to one end of the second groove) and is wound from the second end (e.g., reference 109') of the outer surface 111 to the first end (e.g., reference 109) of the body (e.g., reference 112).

In some embodiments, the present invention provides a method for cooling an optical gain fiber. This method includes providing the optical gain fiber; providing an optical-fiber-contact body having an inwardly facing surface and an outwardly facing surface on opposite sides of a heat-conductive material, wherein the outwardly facing surface includes a surface feature that spaces apart a plurality of loops of the optical gain fiber; guiding the fiber at a first end of the optical-fiber-contact body through the optical-fiber-contact body to the inwardly-facing surface; looping the fiber in a plurality of loops in thermal contact with the inwardly facing surface of the optical-fiber-contact body in a direction from the first end of the optical-fiber-contact body towards a second end of the optical-fiber-contact body; guiding the fiber at the second end of the optical-fiber-contact body from the inwardly facing surface, through the optical-fiber-contact body from the inwardly facing surface to the outwardly facing surface; and winding the fiber in a plurality of loops in thermal contact with the outwardly facing surface of the optical-fiber-contact body in a direction from the second end of the optical-fiber-contact body towards the first end of the optical-fiber-contact body.

Some embodiments further include providing at least one heat sink; and attaching the at least one heat sink to the optical-fiber-contact body.

In some embodiments, at least a portion of the fiber is doped with a gain species, and the method further includes introducing pump light into the fiber; introducing signal light into the fiber; and amplifying the signal light with the pump light and the gain species in the fiber.

In some embodiments, at least a portion of the fiber is doped with a gain species, and the method further includes introducing more than one kilowatt of pump-light power into the gain fiber; introducing a laser seed signal into the fiber; and amplifying the laser seed signal using the pump light and the gain species in the fiber and outputting the amplified signal.

In some embodiments, the fiber is a double-clad gain fiber having a core and a first cladding layer, wherein the core is doped with a gain species, and the method further includes introducing pump light into the first cladding layer such that the pump light propagates into the core; introducing signal light into the core; and amplifying the signal light with the pump light in the core.

In some embodiments, a cross section of the optical-fiber-contact body has a substantially circular inner circumference and a substantially circular outer circumference.

In some embodiments, the optical-fiber-contact body includes a plurality of substantially identical optical-fiber-contact sections attached end-to-end with one another.

Some embodiments further include providing a first optical component, a second optical component, and a mounting substrate; mounting the first optical component, the second optical component, and the optical-fiber-contact body to a first face of the mounting substrate; connecting the first optical component to a first end of the fiber, wherein the first end of the optical fiber is in a first plane substantially parallel to the first face of the mounting substrate; and connecting the second optical component to a second end of the fiber, wherein the second end of the optical fiber is also in the first plane substantially parallel to the first face of the mounting substrate.

In some embodiments, the optical-fiber-contact body has an active cooling structure in contact with the optical-fiber-contact body.

Some embodiments further include providing an active cooling structure embedded inside of the optical-fiber-contact body.

In some embodiments, the present invention provides an apparatus for holding and cooling an optical fiber. This apparatus includes an optical-fiber-contact body having an inwardly facing surface and an outwardly facing surface on opposite sides of a heat-conductive material, wherein the optical-fiber-contact body has a first end and a substantially opposite second end and the outwardly facing surface includes a surface feature that spaces apart a plurality of loops of the optical fiber; an optical gain fiber, wherein the optical gain fiber has a plurality of loops in thermal contact with the inwardly facing surface of the optical-fiber-contact body in a direction from the first end of the optical-fiber-contact body towards the second end of the optical-fiber-contact body, and the optical gain fiber has a plurality of loops in thermal contact with the outwardly facing surface of the optical-fiber-contact body in a direction from the second end of the optical-fiber-contact body towards the first end of the optical-fiber-contact body.

In some embodiments, a cross section of the optical-fiber-contact body has a substantially circular inner circumference and a substantially circular outer circumference, and wherein the optical-fiber-contact body first end and the opposite second end have a central axis of the body that passes between the first end and the second end.

Some embodiments of the apparatus further include at least one heat sink having a plurality of fins and attached to the optical-fiber-contact body.

In some embodiments, the optical-fiber-contact body includes a plurality of substantially identical optical-fiber-contact sections attached end-to-end to one another In some embodiments, the optical-fiber-contact body includes a first transition end section and a second transition end section and a plurality of substantially identical optical-fiber-contact sections attached end-to-end to one another between the first transition end section and the second transition end section, and the apparatus further includes a heat sink attached to the optical-fiber-contact body.

In some embodiments, the optical-fiber-contact body includes a first transition end section and a second transition end section and a plurality of substantially identical optical-fiber-contact sections attached end-to-end to one another between the first transition end section and the second transition end section, and the apparatus further includes a heat-sink base attached to the optical-fiber-contact body. The optical fiber having a first fiber end and a second fiber end, wherein the first end of the optical fiber is placed against the heat-sink base, the optical fiber is fed between an inwardly facing surface and an outwardly facing surface of the first transition end section and is looped in a plurality of side-by-side loops along the inwardly facing surface from the first end to the second end, wherein the optical fiber is fed from the inwardly facing surface, between the outwardly facing surface and the inwardly facing surface of the second transition end section, and the optical fiber is looped in a plurality of side-by-side loops along the outwardly facing surface from the second end to the first end, and wherein the second end of the optical fiber is placed on the heat sink base.

In some embodiments, the inwardly facing surface includes a first helical groove for receiving the plurality of loops of the fiber, the first helical groove traveling in a direction from the first end to the second end.

In some embodiments, the outwardly facing surface includes a second helical groove for receiving the plurality of loops of the fiber, the second helical groove traveling in a direction from the second end to the first end.

Some embodiments further include a heat sink configured to go over the outwardly facing surface and clamp securely to the optical-fiber-contact body.

In some embodiments, the present invention provides an apparatus that includes an optical gain fiber; an optical-fiber-contact body having an inwardly facing surface and an outwardly facing surface on opposite sides of a heat-conductive material, wherein the outwardly facing surface includes a surface feature that spaces apart a plurality of loops of the optical gain fiber; means (as described herein) for guiding the fiber at a first end of the optical-fiber-contact body through the optical-fiber-contact body to the inwardly-facing surface; means for looping the fiber in a plurality of loops in thermal contact with the inwardly facing surface of the optical-fiber-contact body in a direction from the first end of the optical-fiber-contact body towards a second end of the optical-fiber-contact body; means for guiding the fiber at the second end of the optical-fiber-contact body from the inwardly facing surface, through the optical-fiber-contact body from the inwardly facing surface to the outwardly facing surface; and means for guiding the fiber in a plurality of loops wound in thermal contact with the outwardly facing surface of the optical-fiber-contact body in a direction from the second end of the optical-fiber-contact body towards the first end of the optical-fiber-contact body.

In some embodiments, the present invention provides a method for cooling an optical gain fiber. This method includes providing the optical gain fiber; providing a optical-fiber-contact body having an inwardly facing surface and an outwardly facing surface on opposite sides of a heat-conductive material, wherein the outwardly facing surface includes a surface feature that spaces apart a plurality of loops of the optical gain fiber; guiding the fiber at a first end of the optical-fiber-contact body through the optical-fiber-contact body to the inwardly-facing surface; looping the fiber in a plurality of loops in thermal contact with the inwardly facing surface of the optical-fiber-contact body in a direction from the first end of the optical-fiber-contact body towards a second end of the optical-fiber-contact body; guiding the fiber at the second end of the optical-fiber-contact body from the inwardly facing surface, through the fiber-contact body from the inwardly facing surface to the outwardly facing surface; and winding the fiber in a plurality of loops in thermal contact with the outwardly facing surface of the optical-fiber-contact body in a direction from the second end of the optical-fiber-contact body towards the first end of the optical-fiber-contact body.

In some embodiments, the method further includes providing at least one heat-sink base; and attaching the at least one heat-sink base to at least one of the first end and the second end of the optical-fiber-contact body.

In some embodiments, the fiber is doped with a gain species, and the method further includes introducing pump light into the fiber; introducing signal light into the fiber; and amplifying the signal light with the pump light and the gain species in the fiber.

In some embodiments, the fiber is a gain fiber, and the method further includes introducing more than one kilowatt of pump-light power into the gain fiber; introducing a laser seed signal into the fiber; and amplifying the laser seed signal using the pump light and the gain species in the fiber and outputting the amplified signal.

In some embodiments, the fiber is a double-clad gain fiber having a core and a first cladding layer, wherein the core is doped with a gain species, and the method further includes introducing pump light into the first cladding layer such that the pump light propagates into the core; introducing signal light into the core; and amplifying the signal light with the pump light in the core.

In some embodiments, a cross section of the optical-fiber-contact body has a substantially circular inner circumference and a substantially circular outer circumference.

In other embodiments, the optical-fiber-contact body includes a plurality of substantially identical optical-fiber-contact sections attached end-to-end with one another.

In some embodiments, the method further includes providing a first optical component, a second optical component, and a mounting substrate; mounting the first optical component, the second optical component, and the optical-fiber-contact body to a first face of the mounting substrate; connecting the first optical component to a first end of the fiber, wherein the first end of the optical fiber is in a first plane substantially parallel to the first face of the mounting substrate; and connecting the second optical component to a second end of the fiber, wherein the second end of the optical fiber is also in the first plane substantially parallel to the first face of the mounting substrate.

In some embodiments, the optical-fiber-contact body has an active cooling structure in contact with the optical-fiber-contact body.

In other embodiments, the method further includes providing an active cooling structure embedded inside of the optical-fiber-contact body.

In some embodiments, the present invention provides an apparatus for holding and cooling an optical fiber. The apparatus includes an optical-fiber-contact body having an inwardly facing surface and an outwardly facing surface on opposite sides of a heat-conductive material, wherein the outwardly facing surface includes a surface feature that spaces apart a plurality of loops of the optical fiber.

In some embodiments, a cross section of the optical-fiber-contact body has a substantially circular inner circumference and a substantially circular outer circumference, and the optical-fiber-contact body has a first end and a substantially opposite second end and a central axis of the body passes between the first end and the second end.

In some embodiments, the apparatus includes at least one heat sink having a plurality of fins and attached to the optical-fiber-contact body.

In some embodiments, the optical-fiber-contact body includes a plurality of substantially identical optical-fiber-contact sections attached end-to-end to one another In some embodiments, the optical-fiber-contact body includes a first transition end section and a second transition end section and a plurality of substantially identical optical-fiber-contact sections attached end-to-end to one another and to the first transition end section and the second transition end section, and the apparatus further includes a heat sink attached to the optical-fiber-contact body.

In some embodiments, the optical-fiber-contact body includes a first transition end section and a second transition end section and a plurality of substantially identical optical-fiber-contact sections attached end-to-end to one another and to the first transition end section and the second transition end section, and the apparatus further includes a heat sink attached to the optical-fiber-contact body; and the optical fiber has a first fiber end and a second fiber end, and the first end of the optical fiber is placed against the heat-sink base, the optical fiber is fed between an inwardly facing surface and an outwardly facing surface of the first transition end section and is looped in a plurality of side-by-side loops along the inwardly facing surface from the first end to the second end, and the optical fiber is fed from the inwardly facing surface, between the outwardly facing surface and the inwardly facing surface of the second transition end section, and the optical fiber is looped in a plurality of side-by-side loops along the outwardly facing surface from the second end to the first end, and the second end of the optical fiber is placed on the heat sink base.

In some embodiments, the inwardly facing surface includes a first helical groove for receiving a plurality of loops of the fiber, the first helical groove traveling in a direction from the first end to the second end.

In some embodiments, the outwardly facing surface includes a second helical groove for receiving a plurality of loops of the fiber, the second helical groove traveling in a direction from the second end to the first end.

In some embodiments, the apparatus further includes a heat sink configured to go over the outwardly facing surface and clamp securely to the optical-fiber-contact body.

In some embodiments, the present invention provides an apparatus that includes an optical gain fiber; an optical-fiber-contact body having an inwardly facing surface and an outwardly facing surface on opposite sides of a heat-conductive material, wherein the outwardly facing surface includes a surface feature that spaces apart a plurality of loops of the optical gain fiber; means for guiding the fiber at a first end of the optical-fiber-contact body through the optical-fiber-contact body to the inwardly-facing surface; means for looping the fiber in a plurality of loops in thermal contact with the inwardly facing surface of the optical-fiber-contact body in a direction from the first end of the optical-fiber-contact body towards a second end of the optical-fiber-contact body; means for guiding the fiber at the second end of the optical-fiber-contact body from the inwardly facing surface, through the optical-fiber-contact body from the inwardly facing surface to the outwardly facing surface; and means for guiding the fiber in a plurality of loops wound in thermal contact with the outwardly facing surface of the optical-fiber-contact body in a direction from the second end of the optical-fiber-contact body towards the first end of the optical-fiber-contact body.

Some embodiments of this apparatus further include at least one heat sink; and means for attaching the at least one heat sink to the optical-fiber-contact body.

In some embodiments of this apparatus the fiber is doped with a gain species, and the apparatus further includes means for introducing pump light into the fiber; means for introducing signal light into the fiber; and means for amplifying the signal light with the pump light and the gain species in the fiber.

In some embodiments, the apparatus further includes means for introducing more than one kilowatt of pump-light power into the gain fiber; means for introducing a laser seed signal into the fiber; and means for amplifying the laser seed signal using the pump light and the gain species in the fiber and outputting the amplified signal.

In some embodiments, the fiber is a double-clad gain fiber having a core and a first cladding layer, and the core is doped with a gain species, and the apparatus further includes means for introducing pump light into the first cladding layer such that the pump light propagates into the core; means for introducing signal light into the core; and means for amplifying the signal light with the pump light in the core.

In some embodiments, a cross section of the optical-fiber-contact body has a substantially circular inner circumference and a substantially circular outer circumference.

In some embodiments, the optical-fiber-contact body includes a plurality of substantially identical optical-fiber-contact sections attached end-to-end with one another.

In some embodiments, the apparatus further includes means for providing a first optical component, a second optical component, and a mounting substrate; means for mounting the first optical component, the second optical component, and the optical-fiber-contact body to a first face of the mounting substrate; means for connecting the first optical component to a first end of the fiber, wherein the first end of the optical fiber is in a first plane substantially parallel to the first face of the mounting substrate; and means for connecting the second optical component to a second end of the fiber, and the second end of the optical fiber is also in the first plane substantially parallel to the first face of the mounting substrate.

In some embodiments, the optical-fiber-contact body has an active cooling structure in contact with the optical-fiber-contact body.

In some embodiments, the apparatus further includes means for providing an active cooling structure embedded inside of the optical-fiber-contact body.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method for cooling an optical gain fiber, the method comprising:
    providing the optical gain fiber;
    providing an optical-fiber-contact body having an inwardly facing surface and an outwardly facing surface on opposite sides of a heat-conductive material, wherein the outwardly facing surface includes a surface feature that spaces apart a plurality of loops of the optical gain fiber;
    guiding the fiber at a first end of the optical-fiber-contact body through the optical-fiber-contact body to the inwardly-facing surface;
    looping the fiber in a plurality of loops in thermal contact with the inwardly facing surface of the optical-fiber-contact body in a direction from the first end of the optical-fiber-contact body towards a second end of the optical-fiber-contact body;
    guiding the fiber at the second end of the optical-fiber-contact body from the inwardly facing surface, through the optical-fiber-contact body from the inwardly facing surface to the outwardly facing surface; and
    winding the fiber in a plurality of loops in thermal contact with the outwardly facing surface of the optical-fiber-contact body in a direction from the second end of the optical-fiber-contact body towards the first end of the optical-fiber-contact body.

2. The method of claim 1, further comprising:
    providing at least one heat sink; and
    attaching the at least one heat sink to the optical-fiber-contact body.

3. The method of claim 1, wherein at least a portion of the fiber is doped with a gain species, the method further comprising:
    introducing pump light into the fiber;
    introducing signal light into the fiber; and
    amplifying the signal light with the pump light and the gain species in the fiber.

4. The method of claim 1, wherein at least a portion of the fiber is doped with a gain species, the method further comprising:
    introducing more than one kilowatt of pump-light power into the gain fiber;
    introducing a laser seed signal into the fiber; and
    amplifying the laser seed signal using the pump light and the gain species in the fiber and outputting the amplified signal.

5. The method of claim 1, wherein the fiber is a double-clad gain fiber having a core and a first cladding layer, wherein the core is doped with a gain species, the method further comprising:
    introducing pump light into the first cladding layer such that the pump light propagates into the core;
    introducing signal light into the core; and
    amplifying the signal light with the pump light in the core.

6. The method of claim 1, wherein a cross section of the optical-fiber-contact body has a substantially circular inner circumference and a substantially circular outer circumference.

7. The method of claim 1, wherein the optical-fiber-contact body includes a plurality of substantially identical optical-fiber-contact sections attached end-to-end with one another.

8. The method of claim 1, further comprising:
    providing a first optical component, a second optical component, and a mounting substrate;
    mounting the first optical component, the second optical component, and the optical-fiber-contact body to a first face of the mounting substrate;
    connecting the first optical component to a first end of the fiber, wherein the first end of the optical fiber is in a first plane substantially parallel to the first face of the mounting substrate; and
    connecting the second optical component to a second end of the fiber, wherein the second end of the optical fiber is also in the first plane substantially parallel to the first face of the mounting substrate.

9. The method of claim 1, wherein the optical-optical-fiber-contact body has an active cooling structure in contact with the optical-fiber-contact body.

10. The method of claim 1, further comprising providing an active cooling structure embedded inside of the optical-fiber-contact body.

11. An apparatus for holding and cooling an optical fiber, the apparatus comprising:
    an optical-fiber-contact body having an inwardly facing surface and an outwardly facing surface on opposite sides of a heat-conductive material, wherein the opticalfiber-contact body has a first end and a substantially opposite second end and the outwardly facing surface includes a surface feature that spaces apart a plurality of loops of the optical fiber;

an optical gain fiber, wherein the optical gain fiber has a plurality of loops in thermal contact with the inwardly facing surface of the optical-fiber-contact body in a direction from the first end of the optical-fiber-contact body towards the second end of the optical-fiber-contact body, and the optical gain fiber has a plurality of loops in thermal contact with the outwardly facing surface of the optical-fiber-contact body in a direction from the second end of the optical-fiber-contact body towards the first end of the optical-fiber-contact body.

12. The apparatus of claim 11, wherein a cross section of the optical-fiber-contact body has a substantially circular inner circumference and a substantially circular outer circumference, and wherein the optical-fiber-contact body first end and the opposite second end have a central axis of the body that passes between the first end and the second end.

13. The apparatus of claim 11, further comprising at least one heat sink having a plurality of fins and attached to the optical-fiber-contact body.

14. The apparatus of claim 11, wherein the optical-fiber-contact body includes a plurality of substantially identical optical-fiber-contact sections attached end-to-end to one another.

15. The apparatus of claim 11, wherein the optical-fiber-contact body includes a first transition end section and a second transition end section and a plurality of substantially identical optical-fiber-contact sections attached end-to-end to one another between the first transition end section and the second transition end section, the apparatus further comprising:
a heat sink attached to the optical-fiber-contact body.

16. The apparatus of claim 11, wherein the optical-fiber-contact body includes a first transition end section and a second transition end section and a plurality of substantially identical optical-fiber-contact sections attached end-to-end to one another between the first transition end section and the second transition end section, the apparatus further comprising:
a heat-sink base attached to the optical-fiber-contact body, wherein the optical fiber has a first fiber end and a second fiber end, wherein the first end of the optical fiber is placed against the heat-sink base, the optical fiber is located between an inwardly facing surface and an outwardly facing surface of the first transition end section and is looped in a plurality of side-by-side loops along the inwardly facing surface from the first end to the second end, wherein the optical fiber is fed from the inwardly facing surface, between the outwardly facing surface and the inwardly facing surface of the second transition end section, and the optical fiber is looped in a plurality of side-by-side loops along the outwardly facing surface from the second end to the first end, and wherein the second end of the optical fiber is placed on the heat sink base.

17. The apparatus of claim 11, wherein the inwardly facing surface includes a first helical groove for receiving the plurality of loops of the fiber, the first helical groove traveling in a direction from the first end to the second end.

18. The apparatus of claim 11, wherein the outwardly facing surface includes a second helical groove for receiving the plurality of loops of the fiber, the second helical groove traveling in a direction from the second end to the first end.

19. The apparatus of claim 11 further comprising: a heat sink configured to go over the outwardly facing surface and clamp securely to the optical-fiber-contact body.

20. An apparatus comprising:
an optical gain fiber;
an optical-fiber-contact body having an inwardly facing surface and an outwardly facing surface on opposite sides of a heat-conductive material, wherein the outwardly facing surface includes a surface feature that spaces apart a plurality of loops of the optical gain fiber;
means for guiding the fiber at a first end of the optical-fiber-contact body through the optical-fiber-contact body to the inwardly-facing surface;
means for looping the fiber in a plurality of loops in thermal contact with the inwardly facing surface of the optical-fiber-contact body in a direction from the first end of the optical-fiber-contact body towards a second end of the optical-fiber-contact body;
means for guiding the fiber at the second end of the optical-fiber-contact body from the inwardly facing surface, through the optical-fiber-contact body from the inwardly facing surface to the outwardly facing surface; and
means for guiding the fiber in a plurality of loops wound in thermal contact with the outwardly facing surface of the optical-fiber-contact body in a direction from the second end of the optical-fiber-contact body towards the first end of the optical-fiber-contact body.

* * * * *